US012190853B2

(12) United States Patent
Yamaguchi

(10) Patent No.: US 12,190,853 B2
(45) Date of Patent: Jan. 7, 2025

(54) KEYBOARD DEVICE FOR KEYBOARD INSTRUMENT

(71) Applicant: KABUSHIKI KAISHA KAWAI GAKKI SEISAKUSHO, Hamamatsu (JP)

(72) Inventor: Tsutomu Yamaguchi, Hamamatsu (JP)

(73) Assignee: KABUSHIKI KAISHA KAWAI GAKKI SEISAKUSHO, Hamamatsu (JP)

(*) Notice: Subject to any disclaimer, the term of this patent is extended or adjusted under 35 U.S.C. 154(b) by 162 days.

(21) Appl. No.: 18/189,046

(22) Filed: Mar. 23, 2023

(65) Prior Publication Data

US 2023/0317038 A1 Oct. 5, 2023

(30) Foreign Application Priority Data

Mar. 30, 2022 (JP) ................................ 2022-056841

(51) Int. Cl.
*G10H 1/34* (2006.01)

(52) U.S. Cl.
CPC .................................. *G10H 1/344* (2013.01)

(58) Field of Classification Search
CPC ...................................................... G10H 1/344
See application file for complete search history.

(56) References Cited

U.S. PATENT DOCUMENTS 10,847,130 B2 * 11/2020 Terai ...................... G10H 1/346
11,017,749 B2 * 5/2021 Tsuzuku ................... G10C 3/12
2010/0071532 A1 * 3/2010 Kitajima ................ G10H 1/346 84/432
2020/0090633 A1 * 3/2020 Terai ...................... G10H 1/346
2022/0310050 A1 * 9/2022 Yamaguchi ............ G10H 1/346
2023/0101297 A1 * 3/2023 Yamaguchi ............ G10H 1/346 84/644
2023/0317038 A1 * 10/2023 Yamaguchi ............ G10H 1/344 84/423 R
2024/0112651 A1 * 4/2024 Murai ...................... G10C 3/18
2024/0112658 A1 * 4/2024 Kito ........................ G10H 1/346
2024/0112660 A1 * 4/2024 Yamaguchi ............ G10H 1/346

FOREIGN PATENT DOCUMENTS

JP 2019056743 A * 4/2019
JP 2019056781 A * 4/2019
JP 2020-52391 A 4/2020

* cited by examiner

*Primary Examiner* — Robert W Horn
(74) *Attorney, Agent, or Firm* — LEWIS ROCA ROTHGERBER CHRISTIE LLP

(57) ABSTRACT

A keyboard device for a keyboard instrument, including a key support mechanism assembled to a keyboard chassis, improved not only in the ease of assembly during manufacturing of the keyboard device but also in the ease of disassembly during maintenance of the same. The keyboard device includes a keyboard chassis, a key disposed on the keyboard chassis, and a key support mechanism which supports the key from below and causes, upon depression of the key, the depressed key to operate such that the key pivotally moves about a virtual pivot. The key support mechanism includes a first arm and a second arm which, when mounted on the keyboard chassis during assembly of the keyboard device, in a state where one of the arms is pivotally engaged with the keyboard chassis, the other can be mounted on the keyboard chassis while being connected to the one.

4 Claims, 13 Drawing Sheets

KEYBOARD DEVICE FOR KEYBOARD INSTRUMENT

CROSS-REFERENCE TO RELATED APPLICATION

This application claims priority to Japanese Patent Application Number 2022-056841, filed on Mar. 30, 2022, the entire content of which is incorporated herein by reference.

BACKGROUND OF THE INVENTION

Field of the Invention

The present invention relates to a keyboard device which is applied to a keyboard instrument, such as an electronic piano, and in which a key having been depressed operates such that the key is pivotally moved about a virtual pivot located rearward of a rear end thereof.

Description of the Related Art

Conventionally, as this type of a keyboard device, there has been known, for example, one disclosed in Japanese Laid-Open Patent Publication (Kokai) No. 2020-52391 already filed by the present applicant. This keyboard device is comprised of a horizontally extending plate-like base, a plurality of keys provided above the base and extending a predetermined length in a front-rear direction, and a plurality of linkages provided on the base and supporting respective keys from below. Each linkage includes a front-side connecting link bar extending a predetermined length in the front-rear direction with a front end thereof pivotally connected to a front portion of an associated one of the keys, and a rear-side connecting link bar extending a predetermined length in the front-rear direction with a rear end thereof pivotally and slidably connected to a rear end of the associated key. These front-side connecting link bar and rear-side connecting link bar are each pivotally supported at or in the vicinity of a longitudinal center thereof, and are pivotally and slidably connected to each other. Each of the front-side connecting link bar and the rear-side connecting link bar is formed by a long narrow metal plate and is formed into a predetermined shape.

In the keyboard device constructed as described above, when a front end of one of the keys is pressed down by key depression, the front-side connecting link bar and the rear-side connecting link bar pivotally move in predetermined directions, respectively. When the front end of the key reaches its lowest position, the front end of the key is positioned lower by a predetermined distance (e.g. 10 mm) than in a key-released state, and the rear end of the same moves downward by a predetermined distance (e.g. 5 mm) which is approximately half the above-mentioned predetermined distance. That is, in this keyboard device, when a key is depressed, the key pivotally moves about the virtual pivot, as if there is a pivot (virtual pivot) at a predetermined location rearward of the rear end of the key.

In the above-described keyboard device, the front-side connecting link bar and the rear-side connecting link bar of the linkage that supports an associated key are each formed by a metal plate. Therefore, to pivotally support the front-side connecting link bar and the rear-side connecting link bar, on an upper end of a support portion erected on the base, support pins extending in a left-right direction are inserted into respective associated ones of the connecting link bars and are fixed to the support portion. Further, to pivotally and slidably connect the front-side connecting link bar and the rear-side connecting link bar to each other, while the front-side connecting link bar is formed with a slot, the rear-side connecting link bar is provided with a connection pin protruding in the left-right direction. This connection pin is inserted into the slot.

In the linkage constructed as described above, assembly work e.g. at the time of manufacturing the keyboard device is troublesome, and further, it cannot be said that the ease of disassembly at the time of maintenance of the keyboard device is high. Therefore, the above-described keyboard device has room for improvement.

SUMMARY OF THE INVENTION

It is an object of the present invention to provide a keyboard device for a keyboard instrument, which is capable of improving a key support mechanism assembled to a keyboard chassis, not only in the ease of assembly at the time of manufacturing the keyboard device but also in the ease of disassembly at the time of maintenance of the keyboard device.

To attain the above object, the present invention provides a key for a keyboard device, including a keyboard device for a keyboard instrument, including a keyboard chassis, a key extending a predetermined length in a front-rear direction and disposed on the keyboard chassis, and a key support mechanism engaged with the keyboard chassis and provided so as to support the key from below, the key support mechanism causing, upon depression of the key, the depressed key to operate such that the key pivotally moves about a virtual pivot located rearward of a rear end of the key, wherein the key support mechanism includes a first arm configured to extend a predetermined length in the front-rear direction and be pivotally and removably engaged with a first pivot shaft provided on the keyboard chassis, the first arm having a front end pivotally and slidably connected to a front portion of the key, and a second arm configured to extend a predetermined length in the front-rear direction and be pivotally and removably engaged with a second pivot shaft provided on the keyboard chassis at a location rearward of the first pivot shaft, the second arm having a rear end pivotally connected to a rear portion of the key, and including a second arm front-side connecting portion which is disposed forward of the second pivot shaft and is pivotally, slidably and removably connected to a first arm rear-side connecting portion rearward of the first pivot shaft of the first arm, wherein the first arm and the second arm are configured such that when the first arm and the second arm are mounted on the keyboard chassis at the time of assembly of the keyboard device, in a state in which one of the first arm and the second arm is pivotally engaged with the keyboard chassis, the other of the first arm and the second arm is capable of being mounted on the keyboard chassis while being connected to the one of the first arm and the second arm.

With this construction, the key, which extends the predetermined length in the front-rear direction and is disposed on the keyboard chassis, is supported by the key support mechanism having the first arm and second arm, which are pivotally engaged with the keyboard chassis, from below, and when depressed, is caused to operate such that the key is pivotally moved about the virtual pivot located rearward of the rear end of the key. Further, in the key support mechanism, the first arm rear-side connecting portion of the first arm and the second arm front-side connecting portion of the second arm are pivotally and slidably connected. Furthermore, the first arm and the second arm are removably engaged with the keyboard chassis, and are removably connected to each other.

The first arm and the second arm constructed as described above are mounted on the keyboard chassis at the time of assembly of the keyboard device, as follows: First, one of the first arm and the second arm is pivotally engaged with the keyboard chassis. Then, the other of the first arm and the second arm is mounted on the keyboard chassis while being connected to the one of the first arm and the second arm. In this case, in a state in which the arm mounted on the keyboard chassis in advance is pivotally moved as required, the arm to be mounted on the keyboard chassis later is connected to the arm mounted on the keyboard chassis in advance, and is mounted on the keyboard chassis.

As described above, the first arm and the second arm can be relatively easily mounted on the keyboard chassis, and hence, it is possible to improve the ease of assembly of the key support mechanism including the first arm and the second arm at the time of manufacturing the keyboard device. Further, the first arm and the second arm can be removed from the keyboard chassis by a procedure contrary to the above-described procedure, and hence, it is possible to improve the ease of disassembly of the key support mechanism at the time of maintenance of the keyboard device.

Preferably, the second arm front-side connecting portion includes a first protrusion and a second protrusion disposed with a predetermined spacing therebetween and protruding forward of the second arm by a predetermined length, the second arm front-side connecting portion having a U shape open forward of the second arm in side view, and a front end of one of the first protrusion and the second protrusion is formed to protrude forward of a front end of the other of the first protrusion and the second protrusion.

With the construction of this preferred embodiment, the second arm front-side connecting portion of the second arm connected to the first arm includes the first protrusion and second protrusion, and these protrusions form the U shape open forward of the second arm in side view. Therefore, when connecting the first arm and the second arm, the first arm rear-side connecting portion of the first arm is inserted into the second arm front-side connecting portion of the second arm, more specifically, from forward of the U shape formed by the first protrusion and the second protrusion.

Further, the front end of one of the first protrusion and the second protrusion of the second arm front-side connecting portion is formed to protrude forward of the front end of the other of the first protrusion and the second protrusion. When connecting the first arm and the second arm as described above, by performing an operation for connecting the first arm and the second arm, while bringing one of the front ends of the first protrusion and the second protrusion, which protrudes more forward, and an inner surface thereof, into contact with the first arm rear-side connecting portion, it is possible to use the protrusion as a guide. This makes it possible to easily perform the operation for connecting the first arm and the second arm.

Preferably, the second arm includes a bearing portion formed into a C shape in side view, for being engaged with the second pivot shaft by snap-fitting.

With the construction of this preferred embodiment, the second arm includes the bearing portion which has a C shape in side view, for being pivotally engaged with the second pivot shaft. Further, the bearing portion is engaged with the second pivot shaft by snap-fitting. With this, when the second arm is mounted on or removed from the second pivot shaft, it is possible, by causing some magnitude of force to act on the second arm, to elastically deform an open portion of the bearing portion, whereby it is possible to easily engage and disengage the second arm with and from the second pivot shaft.

More preferably, the second arm is formed with a tool engagement portion with which a predetermined tool is engaged when the second arm is removed from the keyboard chassis at the time of maintenance of the keyboard device.

With the construction of this preferred embodiment, when the second arm is removed from the keyboard chassis at the time of maintenance of the keyboard device, the predetermined tool is engaged with the tool engagement portion and is, for example, operated in a predetermined direction, whereby the second arm of which the bearing portion is engaged with the second pivot shaft by snap-fitting can be easily removed from the keyboard chassis.

The above and other objects, features, and advantages of the present invention will become more apparent from the following detailed description taken in conjunction with the accompanying drawings.

BRIEF DESCRIPTION OF THE DRAWINGS

FIGS. 1A and 1B are perspective views of a part (one octave section) of a keyboard device for an electronic piano to which the present invention is applied, in which FIG. 1A shows the appearance of the keyboard device and FIG. 1B shows a state in which keys other than a white key and a black key at a left end of the keyboard device are omitted;

FIGS. 4A and 4B are perspective views of the white key and the key support mechanism therefor, in which FIG. 4A shows the white key and the key support mechanism in a connected state and FIG. 4B shows the white key and the key support mechanism in an exploded state;

FIGS. 5A and 5B are perspective views of the black key and the key support mechanism therefor, in which FIG. 5A shows the black key and the key support mechanism in a connected state and FIG. 5B shows the black key and the key support mechanism in an exploded state;

FIGS. 6A and 6B are views useful in explaining operation of the white key in the keyboard device, in which FIG. 6A shows a key-released state and FIG. 6B shows a key-depressed state;

FIGS. 7A and 7B are views useful in explaining operation of the black key in the keyboard device, in which FIG. 7A shows a key-released state and FIG. 7B shows a key-depressed state;

FIGS. 10A and 10B are enlarged views useful in explaining shapes and sizes of the second pivot shaft and a bearing portion of the second arm, in which FIG. 10A shows the second pivot shaft and FIG. 10B shows the bearing portion of the second arm;

DETAILED DESCRIPTION OF PREFERRED EMBODIMENTS

Figure 1A:
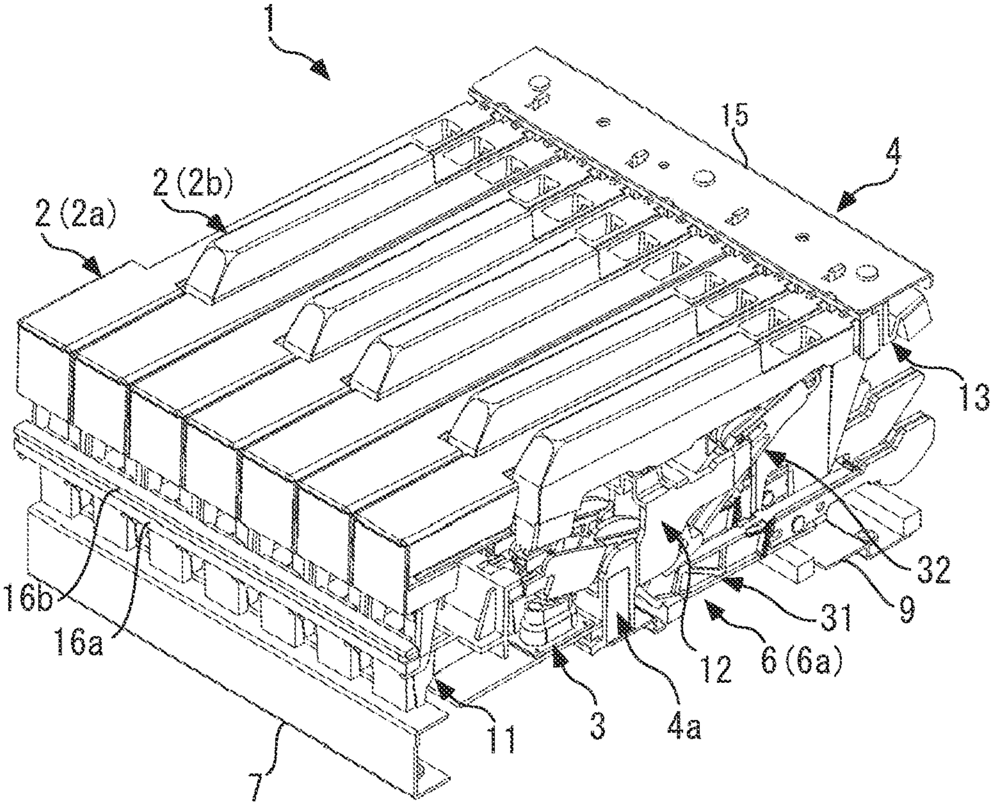

The present invention will now be described in detail with reference to the drawings showing preferred embodiments thereof. FIG. 1A shows only one octave section of a keyboard device 1 for an electronic piano to which the present invention is applied. Note that in the following, a description will be first given of the basic construction of the keyboard device 1 and operation thereof, and then of an essential part of the present invention.

Figure 1B:
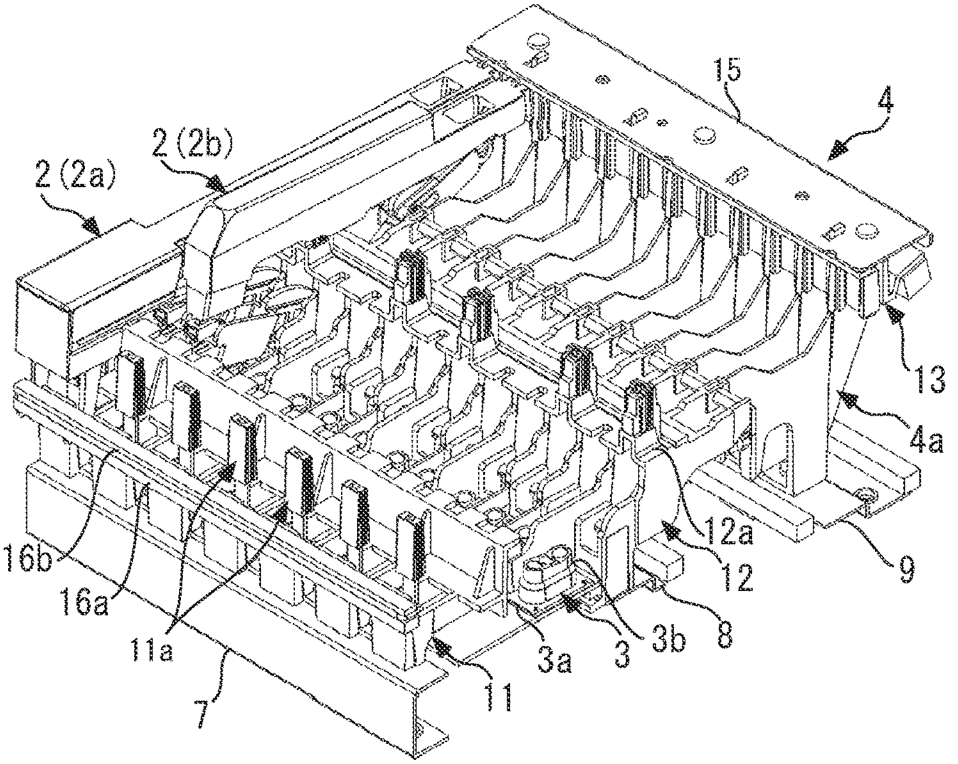
Figure 2:
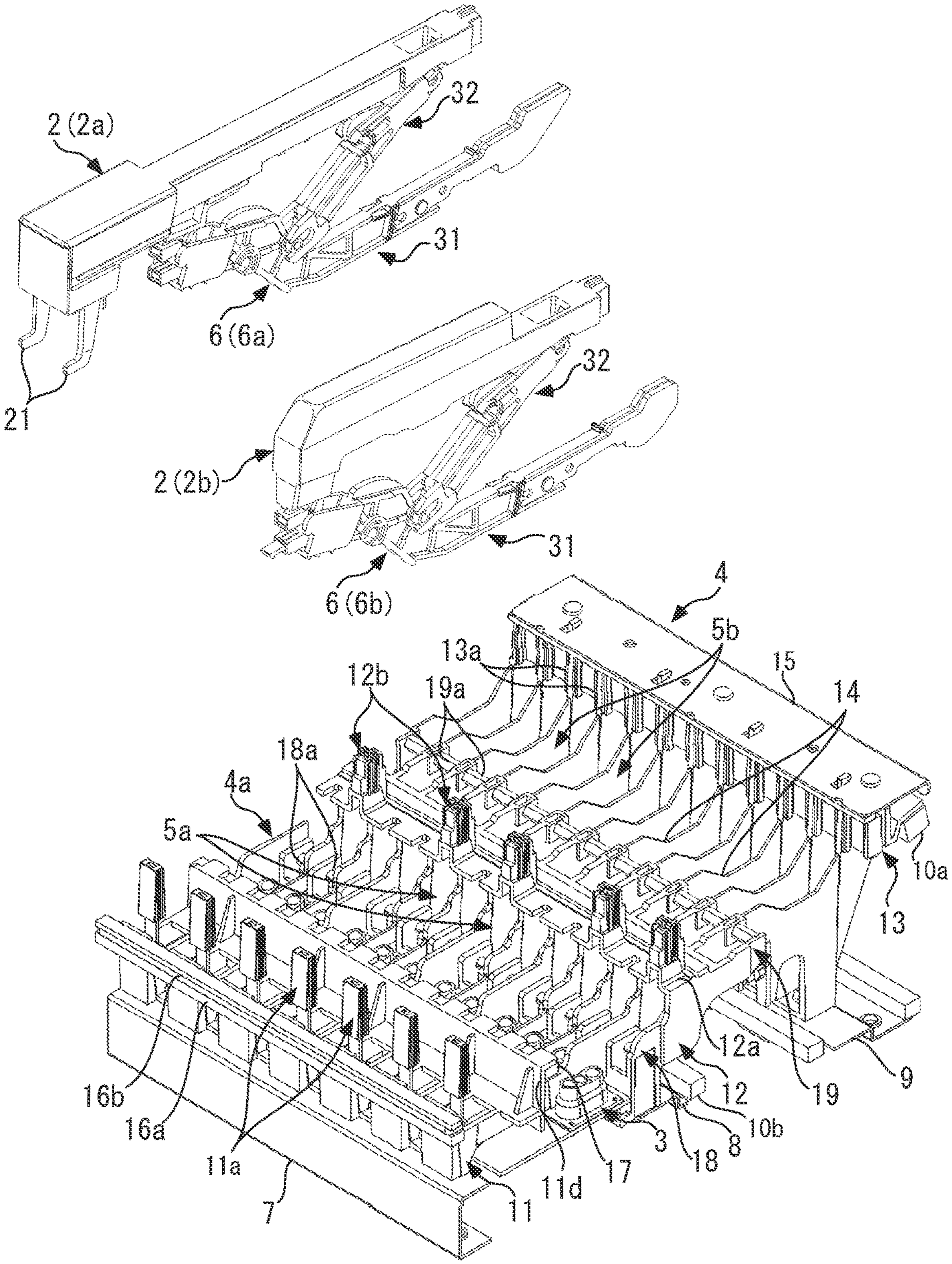
FIG. 2 is a perspective view of the keyboard device shown in FIG. 1B in a state in which the white key and the black key are removed, together with respective key support mechanisms therefor, from a keyboard chassis.

FIG. 1B shows a state of the keyboard device 1 shown in FIG. 1A, in which keys 2 other than a white key 2*a* and a black key 2*b* at the left end of the keyboard device 1 are omitted. FIG. 2 shows a state of the keyboard device 1 shown in FIG. 1B, in which the white key 2*a* and the black key 2*b* are removed, together with respective key support mechanisms 6 therefor, from a keyboard chassis 4.

This keyboard device 1 is comprised of the keyboard chassis 4, the plurality of keys 2 including the white keys 2*a* and the black keys 2*b* and arranged in a state arranged side by side in a left-right direction, the plurality of key support mechanisms 6 each pivotally mounted on the keyboard chassis 4, for supporting an associated one of the keys 2 from below, and key switches 3 each for detecting key depression information of an associated one of the keys 2.

Figure 3A:
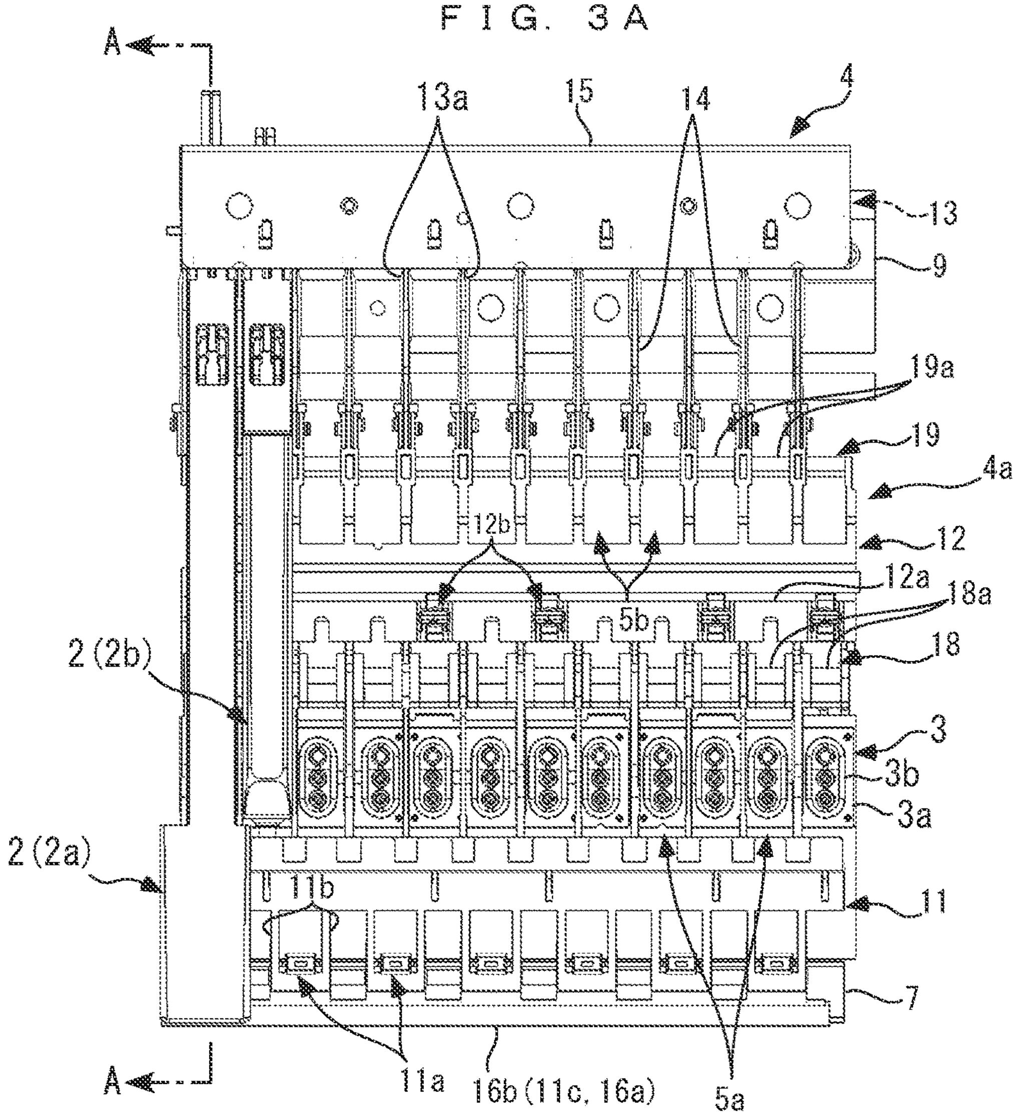
FIG. 3A is a plan view of the keyboard device shown in FIG. 1B
Figure 3B:
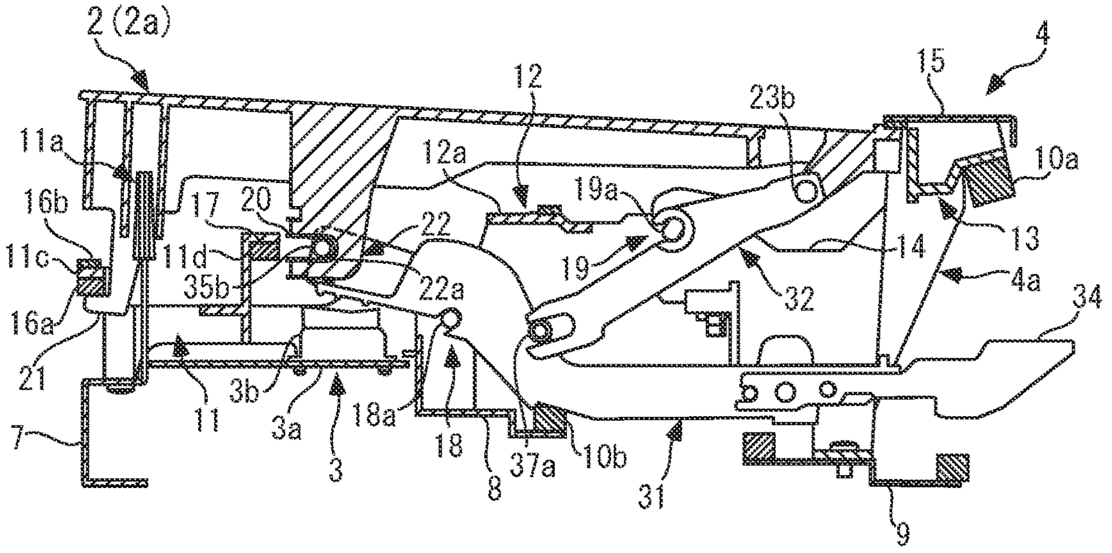
FIG. 3B is a cross-sectional view taken along line A-A of FIG. 3A.

The keyboard chassis 4 includes a chassis body 4*a* formed as a resin molded article which is made e.g. by injection molding of a predetermined resin material (e.g. an ABS resin) into a predetermined shape. As shown in FIGS. 3A and 3B, the chassis body 4*a* has a front portion 11, an intermediate portion 12, and a rear portion 13, each extending in the left-right direction (in a left-right direction as viewed in FIG. 3A) as a whole. The front portion 11, the intermediate portion 12, and the rear portion 13 are integrally formed with each other via a plurality of ribs 14 disposed with a spacing therebetween in the left-right direction and each extending in the front-rear direction. Note that in the following description, the front portion 11, the intermediate portion 12, and the rear portion 13 of the chassis body 4*a* of the keyboard chassis 4 will be referred to as "the chassis front 11", "the chassis intermediate 12", and "the chassis rear 13", respectively.

The chassis front 11 is mainly for guiding the white key 2*a* during depression thereof and restricting the upper limit position and the lower limit position of a front end of the white key 2*a*. On the chassis front 11, there are erected a plurality of white key guides 11*a*, each of which is inserted into each associated one of the white keys 2*a* from below so as to prevent lateral swing of the white key 2*a*, in a state arranged side by side in the left-right direction. Further, the chassis front 11 has engagement holes 11*b* and 11*b*, vertically extending therethrough, which are formed on the left and right sides of each of the white key guides 11*a*, respectively. A pair of left and right upper limit position regulation portions 21 and 21, referred to hereinafter, of the white key 2*a* are engaged with the respective engagement holes 11*b* and 11*b* in a state inserted therethrough. Furthermore, the chassis front 11 has a front end thereof formed with a stopper-mounting portion 11*c* that protrudes forward and extends along the entirety of the chassis body 4*a* in the left-right direction. A key upper limit stopper 16*a* and a key lower limit stopper 16*b* for the white key are mounted on a lower surface and an upper surface of the stopper-mounting portion 11*c*, respectively, such that they extend in the left-right direction. Note that a stopper-mounting portion 11*d* for the black key, which extends along the entirety of the chassis body 4*a* in the left-right direction, is provided at a predetermined location of the chassis front 11, rearward of each white key guide 11*a*, and that a key upper limit stopper 17 for the black key is mounted on the stopper-mounting portion 11*d* such that it extends in the left-right direction.

The chassis intermediate 12 is mainly for guiding the black key 2*b* during depression thereof and swingably supporting a first arm 31 and a second arm 32, described hereinafter, of each of a white key-associated key support mechanism 6*a* and a black key-associated key support mechanism 6*b*. The chassis intermediate 12 has a flat portion 12*a* in the form of a flat plate extending in the left-right direction, and a plurality of black key guides 12*b* erected on the flat portion 12*a* and disposed with an appropriate spacing therebetween in the left-right direction. Each black key guide 12*b* is inserted into an associated one of the black keys 2*b* from below to prevent lateral swing of the black key 2*b*. Further, the chassis intermediate 12 has a front portion thereof provided with a first arm support portion 18 for supporting the first arms 31 of the key support mechanisms 6. The first arm support portion 18 has a plurality of first pivot shafts 18*a* each of which is provided between each adjacent two of the ribs 14 and 14 such that the first pivot shaft 18*a* extends in the left-right direction. The first arms 31 are swingably supported on associated ones of the first pivot shafts 18*a*. Furthermore, the chassis intermediate 12 has a rear portion thereof provided with a second arm support portion 19 for supporting the second arms 32 of the key support mechanisms 6. The second arm support portion 19 has a plurality of second pivot shafts 19*a* each of which is provided between each adjacent two of the ribs 14 and 14 such that the second pivot shaft 19*a* extends in the left-right direction. The plurality of second pivot shafts 19*a* are arranged on the same axis extending in the left-right direction at a location rearward of and higher than the first pivot shafts 18*a*, and the second arms 32 are swingably supported on associated ones of the second pivot shafts 19*a*. Note that a first arm lower limit stopper 10*b* extending along the entirety of the chassis body 4*a* in the left-right direction is provided at a predetermined location of a middle rail 8, referred to hereinafter, disposed below the chassis intermediate 12.

Further, the above-mentioned key switches 3 are provided on a lower portion of the keyboard chassis 4 between the above-described chassis front 11 and chassis intermediate 12. The key switches 3 are formed by a laterally elongated printed circuit board 3*a* extending in the left-right direction, and a plurality of switch bodies 3*b* formed by rubber switches attached to the printed circuit board 3*a* on a key-by-key basis, for being pressed by associated ones of the first arms 31 upon key depression.

The chassis rear 13 is mainly for guiding the keys 2 by their rear ends in the vertical direction while preventing lateral swing of the keys 2 and for restricting the upper limit positions of the rear ends of associated ones of the first arms 31. As shown in FIGS. 2 and 3A, the chassis rear 13 has a plurality of partition walls 13*a* formed with a predetermined spacing therebetween in the left-right direction so as to separate each adjacent two of the keys 2 and 2 from each other. Further, as shown in FIG. 3B, a first arm upper limit stopper 10*a* extending along the entirety of the chassis body 4*a* in the left-right direction is provided at a predetermined location of an upper portion of the chassis rear 13. The first arm upper limit stopper 10*a* and the above-mentioned first arm lower limit stopper 10*b* provided on the chassis intermediate 12 are for restricting the upper limit position and the lower limit position of the first arm 31, respectively, when the first arm 31 having a function as a hammer for adding a touch weight to the key 2 pivotally moves upward and downward. Furthermore, a metal cover plate 15 extending in the left-right direction along the entirety of the chassis body 4*a* and disposed to cover the rear ends of the keys 2 is mounted on the upper portion of the chassis rear 13.

As shown in FIGS. 2 and 3A, the chassis body 4*a* of the keyboard chassis 4 constructed as described above is formed with a plurality of first openings 5*a* open upward and forward and a plurality of second openings 5*b* open upward. The first arms 31 of the key support mechanisms 6 are engaged with associated ones of the first pivot shafts 18*a* from outside via the above-mentioned first openings 5*a*, respectively. Further, the second arms 32 are engaged with associated ones of the second pivot shafts 19*a* from outside via the above-mentioned second openings 5*b*, respectively.

Further, in the above-described keyboard chassis 4, a plurality of chassis bodies 4*a* are connected to each other so as to be arranged side by side in the left-right direction, and are each screwed to a front rail 7, the middle rail 8, and a rear rail 9 in a state placed thereon, the rails 7, 8 and 9 each extending in the left-right direction and arranged with a predetermined spacing therebetween in the front-rear direction. The keyboard chassis 4 is fixed to a keybed, not shown, of the electronic piano via the front rail 7 and the rear rail 9.

Figure 4A:
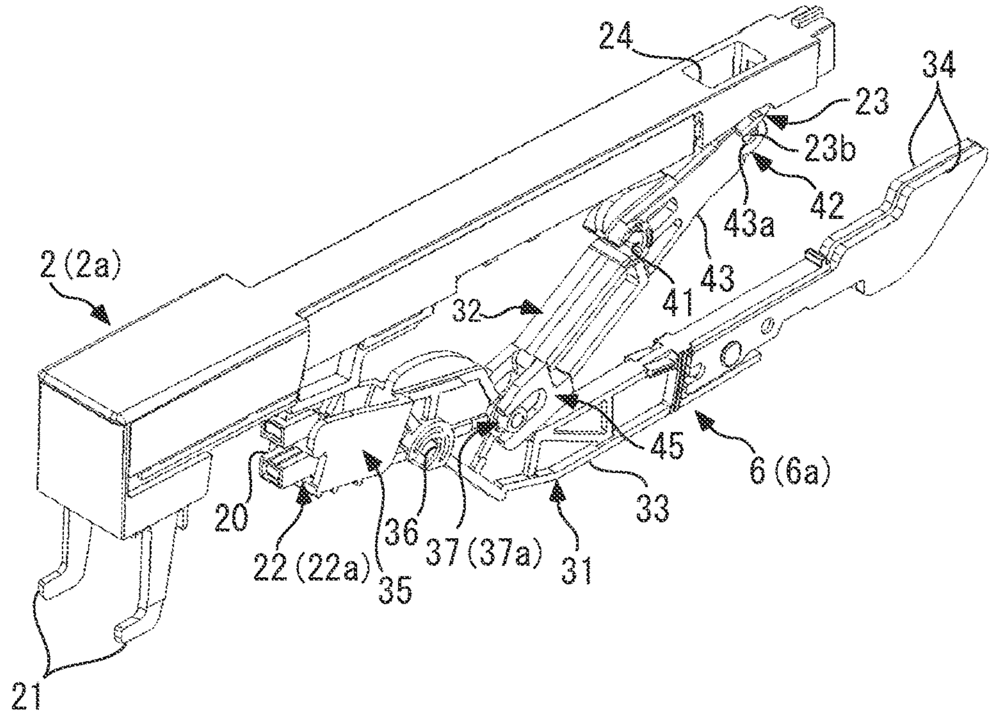
Figure 4B:
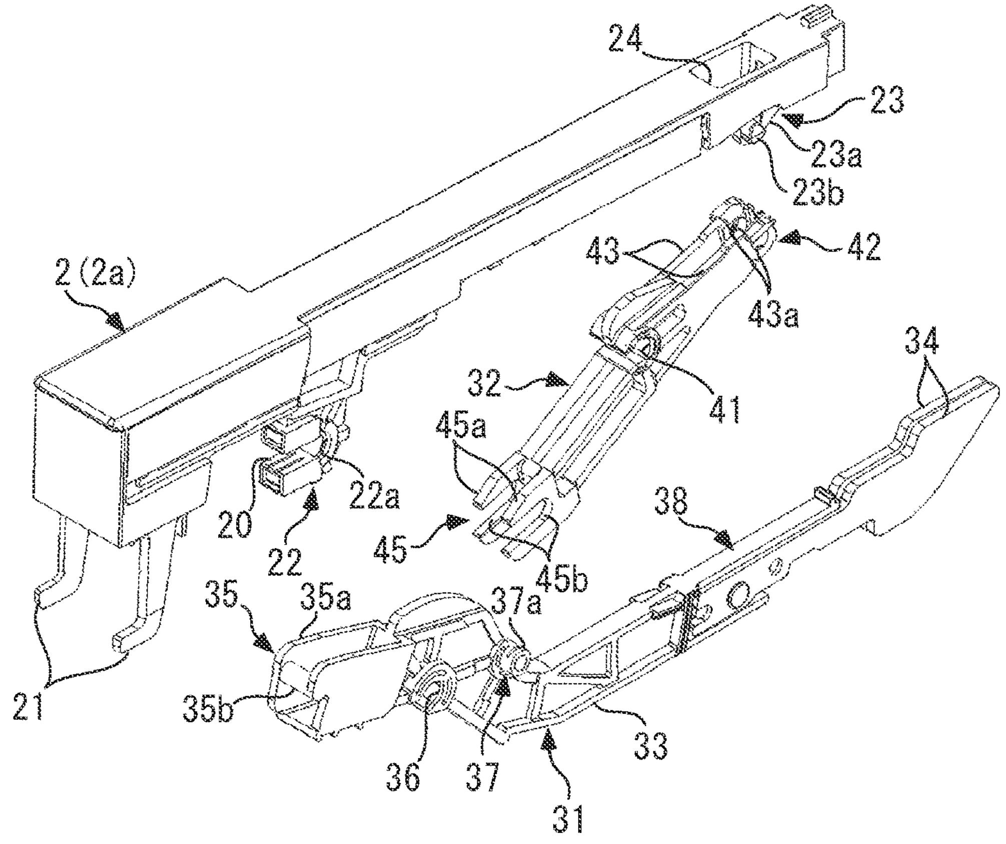

Next, the keys 2 and the key support mechanisms 6 will be described. FIG. 4A shows the white key 2*a* and the key support mechanism 6*a* therefor on an enlarged scale, and FIG. 4B shows them in an exploded state. As shown in FIGS. 4A and 4B, the white key 2*a* is formed e.g. by injection molding of a predetermined resin material (e.g. an AS resin) into a hollow shape which extends a predetermined length in the front-rear direction and opens downward. The white key 2*a* has the front end thereof formed with the pair of left and right upper limit position regulation portions 21 and 21 which protrude downward from respective side walls of the front end of the white key 2*a* and each having a lower end thereof bent forward. As described hereinabove, the left and right upper limit position regulation portions 21 and 21 are engaged with the respective left and right engagement holes 11*b* and 11*b* of the chassis front 11 in a state inserted therethrough.

Further, at a predetermined location of a front portion of the white key 2*a*, rearward of the upper limit position regulation portions 21, there is formed a key front-side connecting portion 22 connected to the first arm 31 of the key support mechanism 6*a*. This key front-side connecting portion 22 includes a connecting recess 22*a* which formed into a U shape having a slot-like shape in side view and open forward. Further, the connecting recess 22*a* has a cushioning member 20 attached thereto, which is formed to cover the whole inner peripheral surface of the connecting recess 22*a*, for suppressing generation of noise when a connecting shaft 35*b*, referred to hereinafter, of the first arm 31 slides in the inner peripheral surface of the connecting recess 22*a*.

Furthermore, the white key 2*a* has a rear portion thereof provided with a key rear-side connecting portion 23 connected to the second arm 32 of the key support mechanism 6*a*. The key rear-side connecting portion 23 has a plate-like connecting body portion 23*a* which hangs downward from a laterally central portion of the white key 2*a* and has a predetermined thickness in the left-right direction, and a pair of left and right engagement protrusions 23*b* and 23*b* which coaxially protrude from the left and right side surfaces of the connecting body portion 23*a*, respectively. Further, the rear portion of the white key 2*a* is formed with a tool insertion hole 24 which vertically extends through the rear portion, and is used to insert a predetermined tool from above for disconnecting the white key 2*a* from the second arm 32 of the key support mechanism 6*a* e.g. for maintenance of the keyboard device 1.

On the other hand, the key support mechanism 6*a* includes the first arm 31 and the second arm 32 which are engaged with each other and are connected to the key front-side connecting portion 22 and the key rear-side connecting portion 23 of the white key 2*a*, respectively.

As shown in FIG. 4B, the first arm 31 is comprised of an arm body 33 and two weights 34 and 34 attached to the arm body 33. The arm body 33 is formed as a resin molded article which is made e.g. by injection molding of a predetermined resin material (e.g. polyacetal resin) into a predetermined shape. This arm body 33 extends a predetermined length in the front-rear direction, and has a front end thereof formed with a first arm front-side connecting portion 35 connected to the key front-side connecting portion 22 of the white key 2*a*. The first arm front-side connecting portion 35 includes a box portion 35*a* having a box-like shape open upward and forward, and the connecting shaft 35*b* provided such that it extends in the left-right direction in a state connecting the front-side upper ends of left and right side walls of the box portion 35*a* to each other. The connecting shaft 35*b* is connected to the connecting recess 22*a* of the key front-side connecting portion 22 of the white key 2*a* such that the connecting shaft 35*b* is pivotally movable and is slidable in the front-rear direction.

Further, the arm body 33 has a bearing portion 36 formed at a predetermined location immediately rearward of the first arm front-side connecting portion 35. The bearing portion 36 has an inverted U shape open downward in side view, and is pivotally engaged with the first pivot shaft 18*a* of the keyboard chassis 4. Furthermore, the arm body 33 has a first arm rear-side connecting portion 37, which is connected to the second arm 32, at a predetermined location rearward of the bearing portion 36. Specifically, the first arm rear-side connecting portion 37 has a connecting shaft 37*a* which extends in the left-right direction with respective opposite ends thereof protruding outward from the left and right side surfaces of the arm body 33. The opposite ends of the connecting shaft 37*a* are engaged with connecting recesses 45*b* and 45*b* of a second arm front-side connecting portion 45, referred to hereinafter, of the second arm 32.

The two weights 34 and 34 formed as elongated and narrow plates are mounted on a weight mounting portion 38, which is a rear portion of the arm body 33, in a state sandwiching the weight mounting portion 38. Note that each weight 34 is made of a material (metal such as iron) having a larger specific gravity than the arm body 33, and is formed e.g. by pressing a metal plate into a predetermined shape.

The second arm 32 is formed as a resin molded article having a predetermined shape by injection molding of the same resin material as that of the arm body 33 of the first arm 31. The second arm 32 is shorter than the first arm 31 and extends a predetermined length in the front-rear direction. Further, the second arm 32 has a bearing portion 41 having a C shape open forward in side view approximately at a longitudinal center thereof. The bearing portion 41 is pivotally engaged with an associated one of the second pivot shafts 19*a* of the keyboard chassis 4.

Further, the second arm 32 has a rear portion thereof provided with a second arm rear-side connecting portion 42 connected to the key rear-side connecting portion 23 of the white key 2*a*. The second arm rear-side connecting portion 42 is formed into a bifurcated shape, and has two left and right connecting arm portions 43 and 43 which extend a predetermined length parallel to each other along the longitudinal direction of the second arm 32. Each connecting arm portion 43 has a rear end thereof formed with a connecting hole 43*a* extending through the connecting arm portion 43 in the left-right direction. The two connecting arm portions 43 and 43 sandwich the connecting body portion 23*a* of the key rear-side connecting portion 23 of the white key 2*a* between the rear ends thereof from the left and the right, and each connecting hole 43*a* has an associated one of the engagement protrusions 23*b* of the key rear-side connecting portion 23 pivotally fitted therein.

Furthermore, the second arm 32 has a front portion thereof provided with the second arm front-side connecting portion 45 connected to the first arm rear-side connecting portion 37 of the first arm 31. The second arm front-side connecting portion 45 has a pair of left and right connecting portions 45*a* and 45*a* arranged with a predetermined spacing in the left-right direction. The connecting portions 45*a* and 45*a* are each formed with the connecting recess 45*b* which has a U shape having a slot-like shape in side view and open forward. The left and right connecting portions 45*a* and 45*a* of the second arm front-side connecting portion 45 are pivotally and slidably engaged with the respective opposite ends of the connecting shaft 37*a* of the first arm 31 via the connecting recesses 45*b* and 45*b* thereof.

Figure 5A:
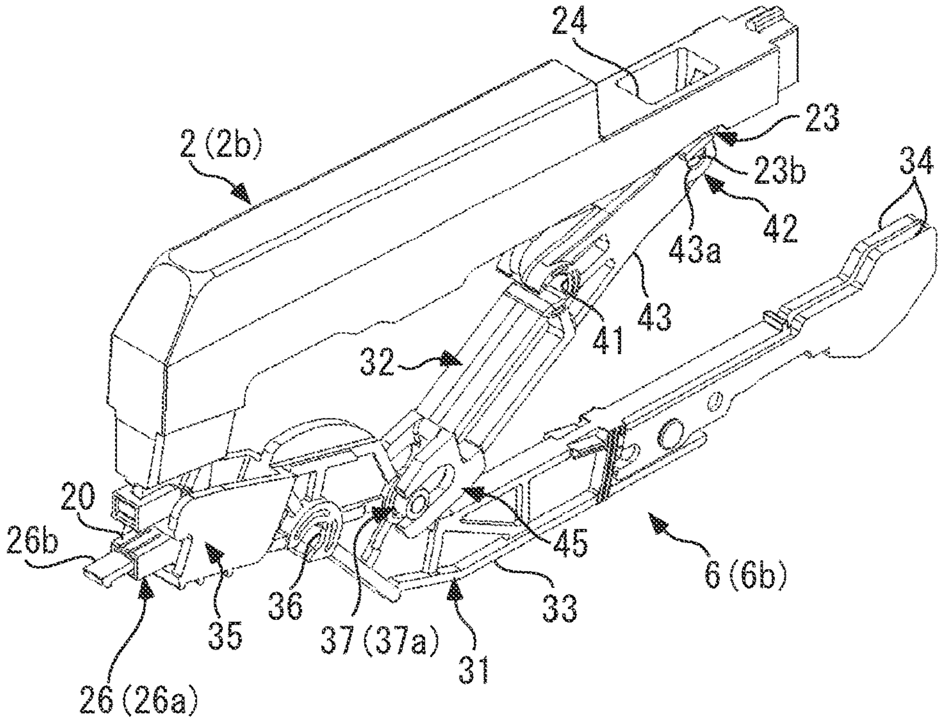
Figure 5B:
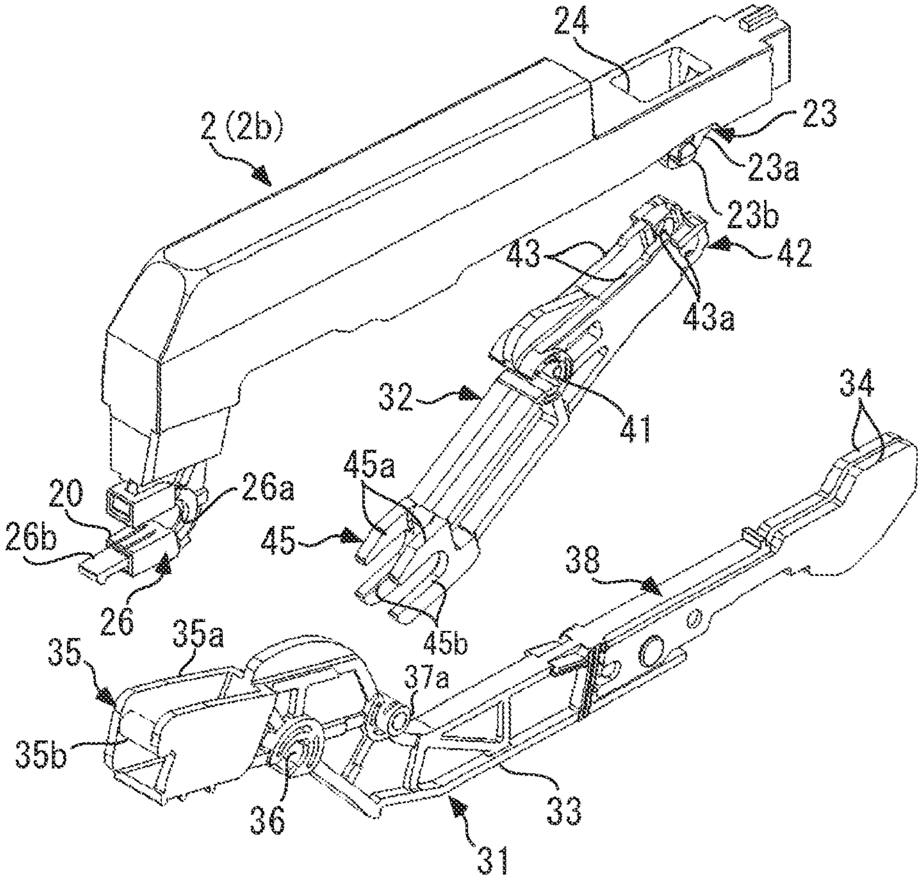

FIG. 5A shows the black key 2*b* and the key support mechanism 6*b* therefor on an enlarged scale, and FIG. 5B shows the black key 2*b* and the key support mechanism 6*b* in an exploded state. The black key 2*b* is formed e.g. by injection molding of the same resin material as that of the white key 2*a* into a hollow shape which extends in the front-rear direction by a predetermined length shorter than that of the white key 2*a* and opens downward. The black key 2*b* has a front-side lower end thereof provided with a key front-side connecting portion 26 formed substantially similar to the key front-side connecting portion 22 of the white key 2*a*. This key front-side connecting portion 26 has a connecting recess 26*a* formed into a U shape having a slot-like shape in side view and open forward. Further, the key front-side connecting portion 26 has an extension portion 26*b* on a lower-side front end of the connecting recess 26*a*. The extension portion 26*b* extends a predetermined length forward of the front surface of the body of the black key 2*b*. This extension portion 26*b* functions as an upper limit position regulation portion of the black key 2*b*. Note that in the following description, the components of the black key 2*b* and the key support mechanism 6*b* having the same configurations as those of the above-described white key 2*a* and key support mechanism 6*a* are denoted by the same reference numerals and detailed description thereof will be omitted.

The key support mechanism 6*b* supporting the black key 2*b* is constructed substantially similar to the above-described white key-associated key support mechanism 6*a*. Specifically, the arm body 33 of the first arm 31 of the key support mechanism 6*b* and the second arm 32 of the same are constructed exactly similar in shape and size to the arm body 33 and the second arm 32 of the white key-associated key support mechanism 6*a*. Note that two left and right weights 34 and 34 of the black key-associated key support mechanism 6*b* differ from the weights 34 of the white key-associated key support mechanism 6*a* in the shape of the rear portion thereof.

Figure 6A:
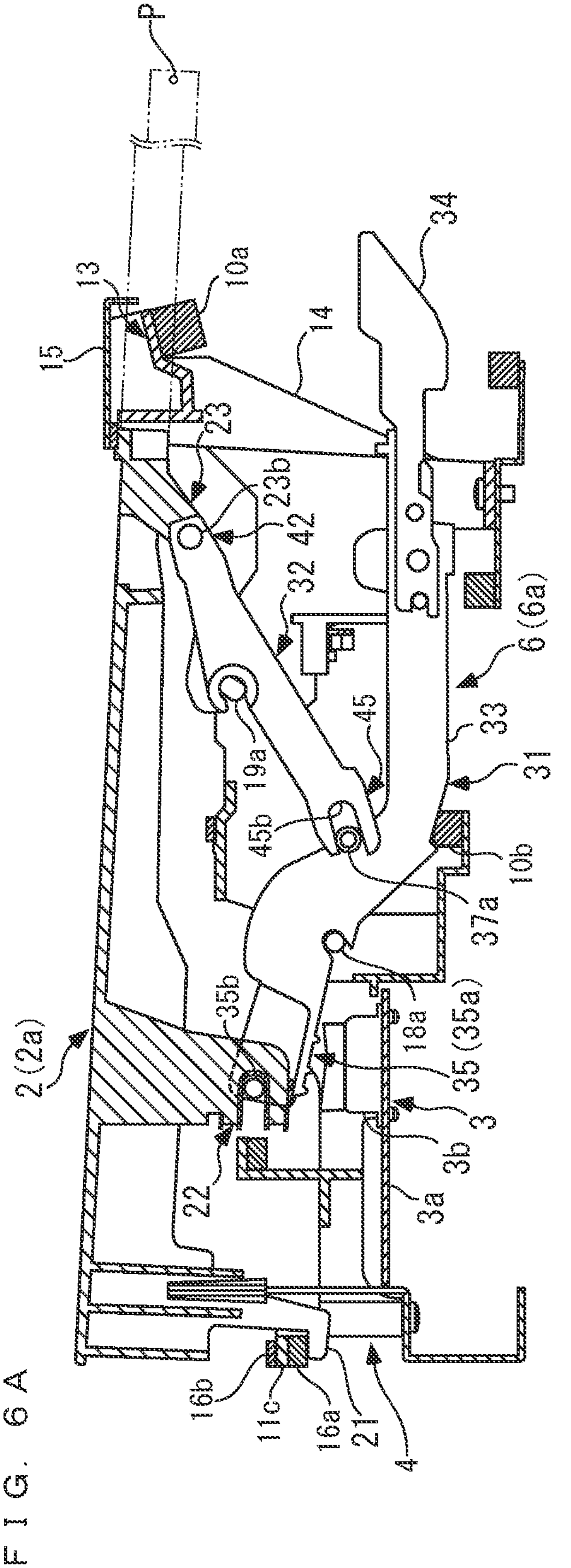
Figure 6B:
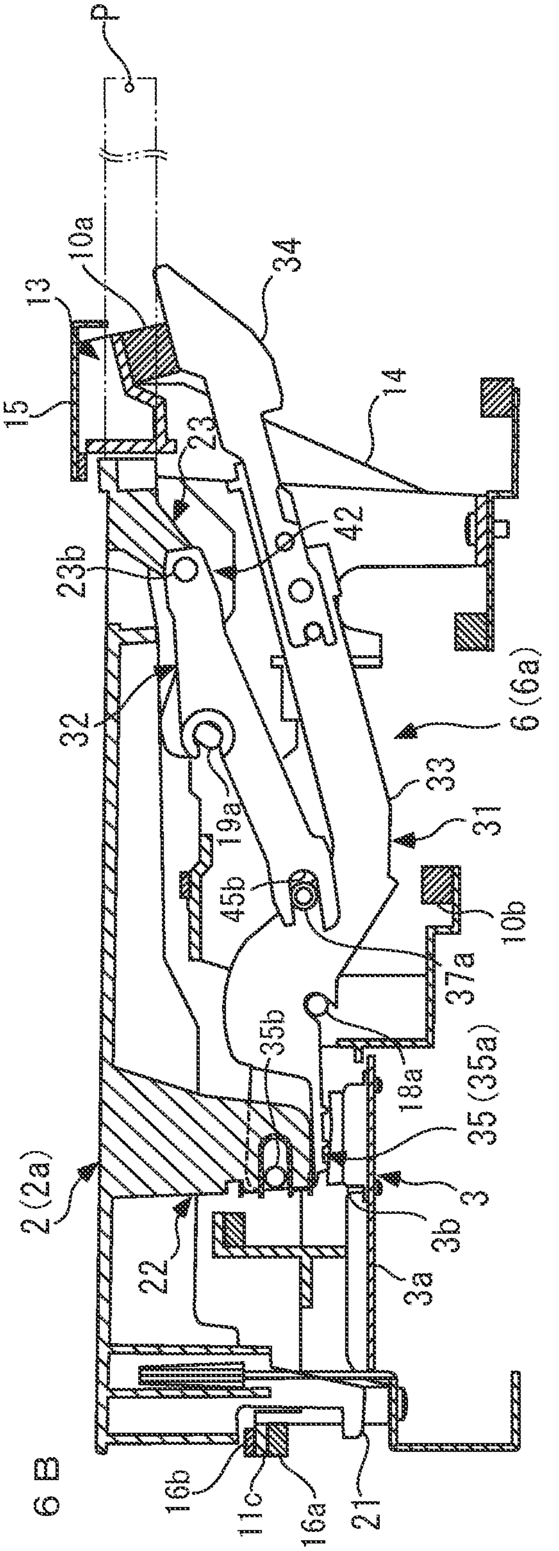
Figure 7A:
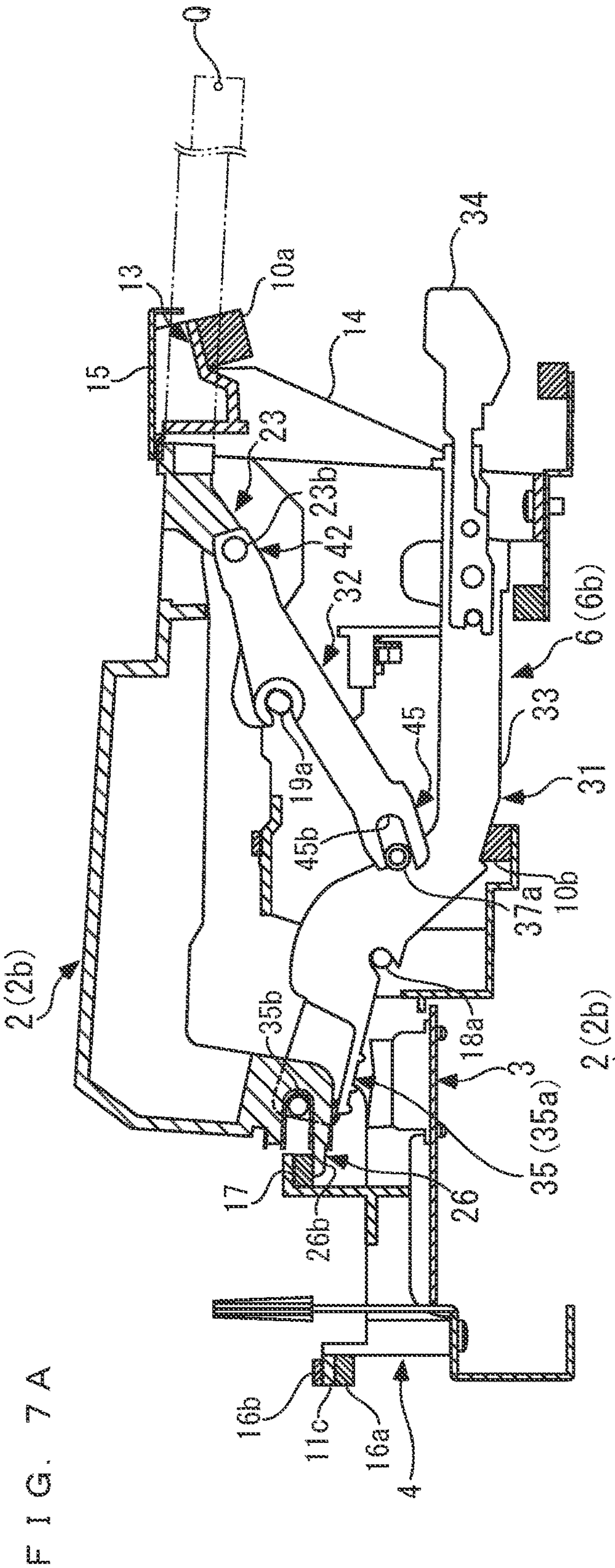
Figure 7B:
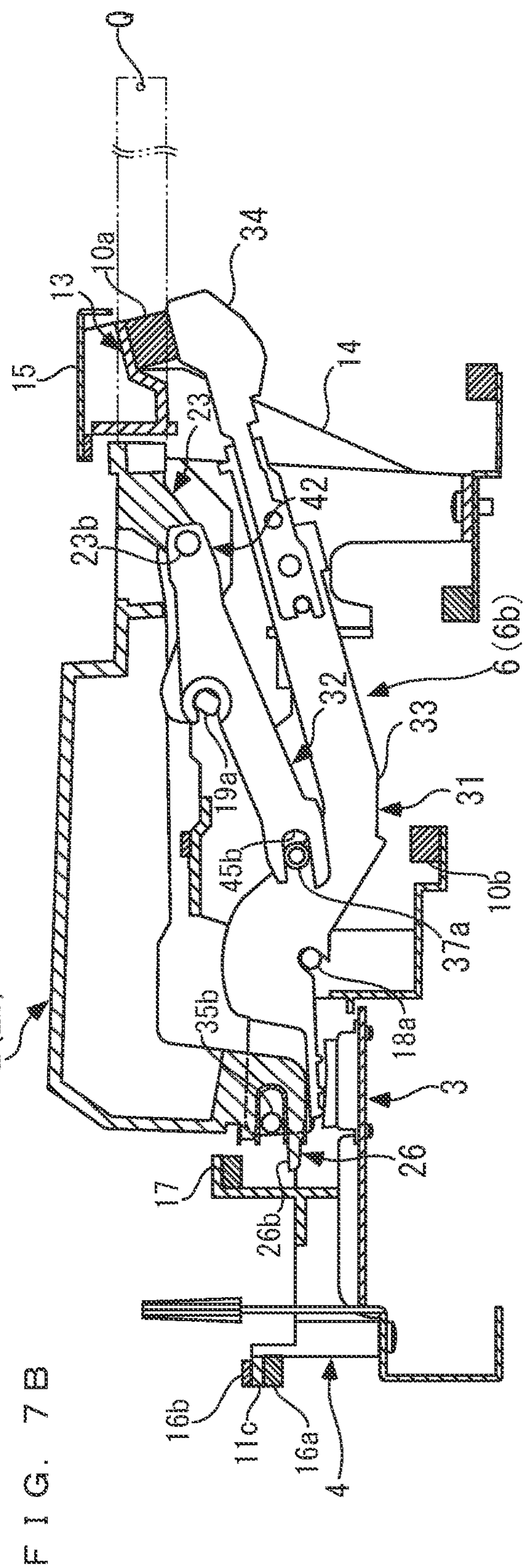

Next, a description will be given of the operation of the keys 2 and the key support mechanisms 6 of the keyboard device 1 constructed as described above. FIGS. 6A and 6B are views useful in explaining the operation of the white key 2*a* and the key support mechanism 6*a* associated therewith. FIGS. 7A and 7B are views useful in explaining the operation of the black key 2*b* and the key support mechanism 6*b* associated therewith.

When the front end of the white key 2*a* is depressed by a player with his/her finger from a key-released state shown in FIG. 6A, the key front-side connecting portion 22 of the white key 2*a* is moved downward, whereby the first arm 31 is pivotally moved in a counterclockwise direction about the first pivot shaft 18*a*. Further, in accordance with the pivotal movement of the first arm 31, the second arm front-side connecting portion 45, which is engaged with the connecting shaft 37*a* of the first arm 31 via the connecting recesses 45*b* and 45*b*, is moved upward. With this, the second arm 32 is pivotally moved in a clockwise direction about the second pivot shaft 19*a*. Then, in accordance with this pivotal movement of the second arm 32, the key rear-side connecting portion 23, which is connected to the second arm 32 via the second arm rear-side connecting portion 42 formed at the rear end of the second arm 32, is pulled down, whereby the rear end of the white key 2*a* is moved downward.

Note that during the above-mentioned pivotal movement of the first arm 31, the box portion 35*a* of the first arm front-side connecting portion 35 is moved downward, and accordingly, the switch body 3*b* of one of the key switches 3, which is associated with the depressed key 2, is pressed from above by the bottom wall of the box portion 35*a*. As a consequence, in the electronic piano, key depression information of the depressed key 2 is detected, and based on the detected key depression information, sound is generated from a speaker, not shown.

As described hereinabove, in the case where the white key 2*a* is depressed, in accordance with the counterclockwise pivotal movement of the first arm 31, the weight 34 of the first arm 31 is inclined such that the weight 34 becomes higher as it extends rearward, whereby the rear end of the weight 34 is brought into contact with the first arm upper limit stopper 10*a* from below, as shown in FIG. 6B. This prevents further pivotal movement of the first arm 31. When the front end of the white key 2*a* is depressed to its lowest position, the front end of the white key 2*a* is brought into contact with the key lower limit stopper 16*b*, which blocks further depression of the white key 2*a*.

The white key 2*a* depressed as above operates such that it pivotally moves about a virtual pivot P located rearward of the rear end thereof. The location of the virtual pivot P is set such that a distance from the front end of the white key 2*a* is approximately twice as long as the length of the white key 2*a* itself, for example. With this, when the front end of the white key 2*a* is depressed to the lowest position, compared with the case where the white key 2*a* is in the key-released state shown in FIG. 6A, the front end of the white key 2*a* is positioned lower by a predetermined key stroke (e.g. 10 mm) and the rear end of the white key 2*a* is located lower by a distance (e.g. 5 mm) which is approximately half of the predetermined key stroke.

On the other hand, when the finger is released from the white key 2*a* being depressed, the first arm 31 of the key support mechanism 6*a* pivotally moves in a direction opposite to the above-mentioned direction, by the own weight of the weight 34, and in accordance therewith, the second arm 32 as well pivotally moves in a direction opposite to the above-mentioned direction. In accordance with this pivotal movement of the second arm 32, the white key 2*a* pivotally moves upward about the virtual pivot P. Then, a predetermined portion of the first arm 31, rearward of the first pivot shaft 18*a*, moves into contact with the first arm lower limit stopper 10*b* from above, and both of the upper limit position regulation portions 21 and 21 of the white key 2*a* move into contact with the key upper limit stopper 16*a* from below, whereby further pivotal movement of the white key 2*a* is blocked and the white key 2*a* returns to its original key-released state.

Further, when the black key 2*b* is depressed as well, operations are performed similar to the above-described operations of the white key 2*a* and the key support mechanism 6*a*. More specifically, when a front end of the black key 2*b* is depressed from a key-released state shown in FIG. 7A, the first arm 31 is pivotally moved in the counterclockwise direction about the first pivot shaft 18*a*, and the second arm 32 is pivotally moved in the clockwise direction about the second pivot shaft 19*a*. With this, the black key 2*b* is operated such that it is pivotally moved about a virtual pivot Q located rearward of the rear end thereof. Note that similar to the above-mentioned virtual pivot P of the white key 2*a*, the location of the virtual pivot Q is set such that a distance from the front end of the black key 2*b* is approximately twice as long as the length of the black key 2*b* itself, for example. Therefore, when the front end of the black key 2*b* is depressed to its lowest position, compared with a case where the black key 2*b* is in the key-released state shown in FIG. 7A, the front end of the black key 2*b* is positioned lower by a predetermined key stroke and the rear end thereof is positioned lower by a distance which is approximately half of the predetermined key stroke.

On the other hand, when the finger is released from the black key 2*b* having been depressed, the first arm 31 and the second arm 32 of the key support mechanism 6*b* pivotally move in respective directions opposite to the above-mentioned directions, and in accordance therewith, the black key 2*b* pivotally moves upward about the virtual pivot Q. Then, the extension portion 26*b* of the key front-side connecting portion 26 of the black key 2*b* moves into contact with the key upper limit stopper 17 from below, whereby further pivotal movement of the black key 2*b* is blocked, and the black key 2*b* returns to its original key-released state.

Next, the essential part of the present invention will be described with reference to FIGS. 8 to 14. The essential part of the present invention is that the key support mechanism 6 which is assembled to the keyboard chassis 4 and includes the first arm 31 and the second arm 32 is configured such that the key support mechanism 6 is improved not only in the ease of assembly at the time of manufacturing the keyboard device 1 but also in the ease of disassembly at the time of maintenance of the keyboard device 1.

Figure 8:
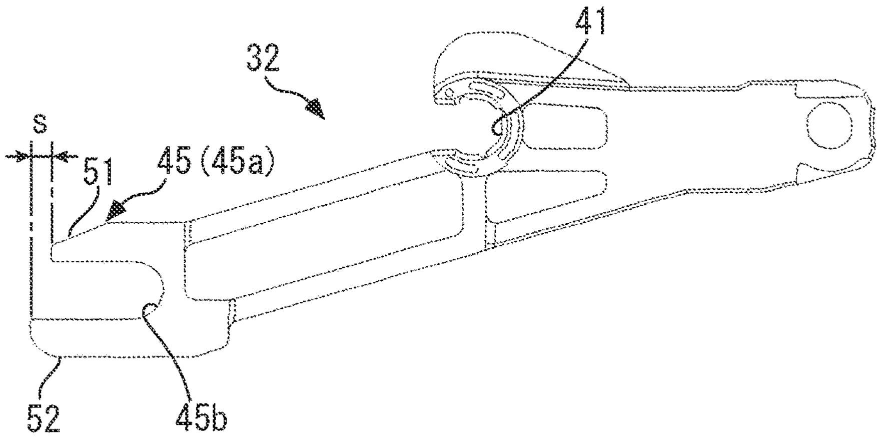
FIG. 8 is a side view showing a second arm on an enlarged scale.

FIG. 8 is a side view showing the second arm 32 on an enlarged scale. As described above, the second arm 32 is provided with the bearing portion 41 having a C shape, approximately at the longitudinal center thereof, and is provided with the second arm front-side connecting portion 45, at the front portion thereof. The second arm front-side connecting portion 45 includes the pair of left and right connecting portions 45*a* and 45*a* (only one on the near side appears in FIG. 8). Each connecting portion 45*a* is formed with the connecting recess 45*b*.

The connecting recess 45*b* is formed by a first protrusion 51 and a second protrusion 52, which are vertically arranged, into a U shape open forward. These first protrusion 51 and second protrusion 52 are disposed with a predetermined spacing therebetween in the vertical direction and protrude forward by a predetermined length. Further, as shown in FIG. 8, the lower second protrusion 52 is formed such that a front end thereof protrudes forward by a predetermined length s with respect to the upper first protrusion 51.

Figure 9A:
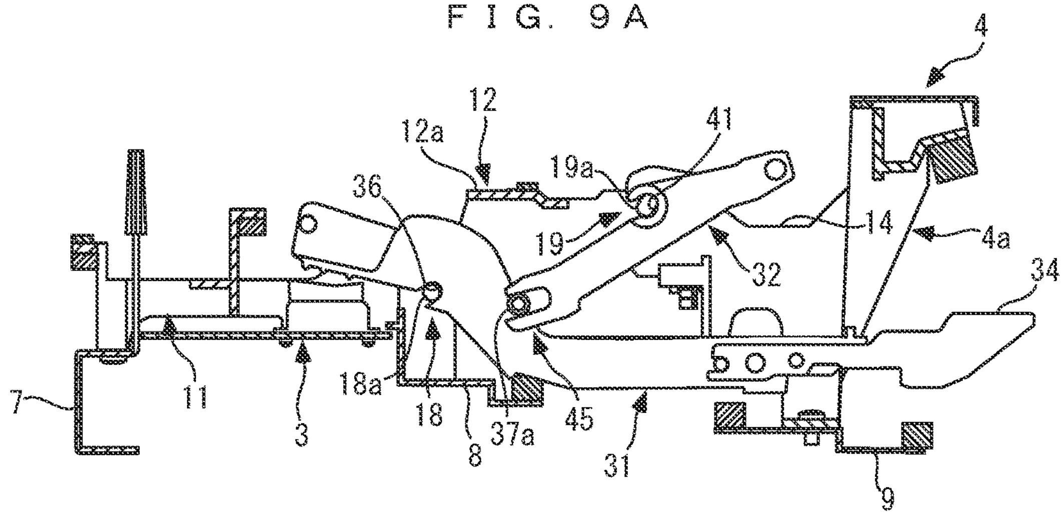
FIG. 9A is a side view showing a state in which a first arm and the second arm are mounted on the keyboard chassis.
Figure 9B:
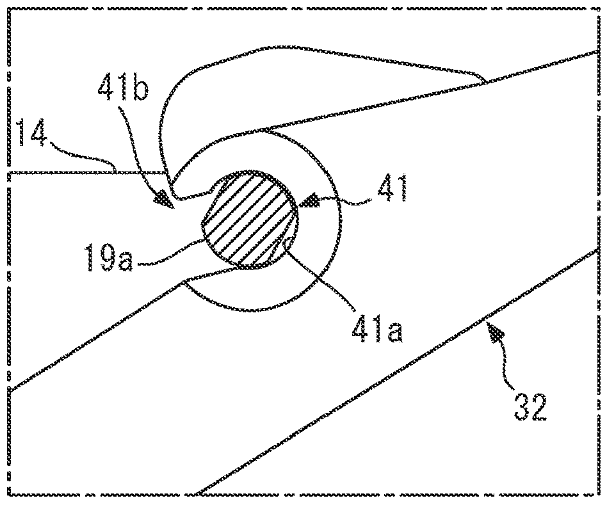
FIG. 9B is a view of a second pivot shaft that supports the second arm and components therearound on an enlarged scale.

FIG. 9A shows a state in which the first arm 31 and the second arm 32 are mounted on the keyboard chassis 4, and FIG. 9B shows the second pivot shaft 19*a* that supports the second arm 32 and components therearound on an enlarged scale. FIGS. 9A and 9B show the posture of the second arm 32 and the positional relationship between the bearing portion 41 and the second pivot shaft 19*a* in a state in which the key 2 is not depressed (in the key-released state).

Figure 10A:
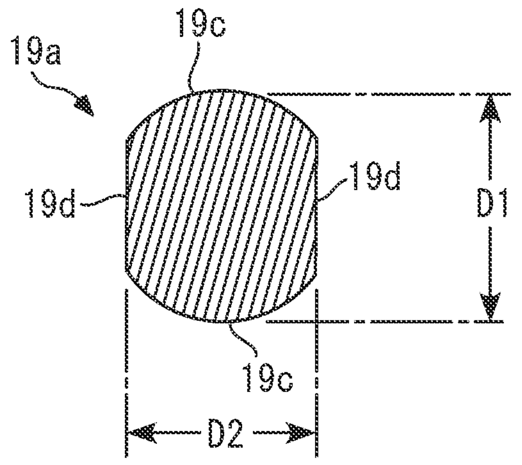

FIG. 10A shows the second pivot shaft 19*a* on an enlarged scale. As shown in FIG. 10A, the second pivot shaft 19*a* has a cross-section in a so-called oval shape in which two portions of a circle, the center of which corresponds to the shaft axis of the second pivot shaft 19*a*, are cut out. An outer peripheral surface of the second pivot shaft 19*a* is formed by a pair of curved surfaces 19*c* and 19*c* which are formed in an arcuate shape convex outward and are opposed to each other with a predetermined spacing therebetween, and a pair of planar surfaces 19*d* and 19*d* which have ends continuous with ends of the pair of curved surfaces 19*c* and 19*c* and are parallelly opposed to each other with a predetermined spacing therebetween. Further, in the second pivot shaft 19*a*, a distance D1 between respective vertices of the pair of curved surfaces 19*c* and 19*c* is set to a value larger than a distance D2 between the pair of planar surfaces 19*d* and 19*d*. Further, as shown in FIGS. 9A and 9B, the second pivot shaft 19*a* is formed such that a long axis thereof, which passes through the axial center of the second pivot shaft 19*a* and extends along a direction in which the pair of curved surfaces 19*c* and 19*c* are opposed to each other, is inclined rearward (rightward in FIGS. 9A and 9B) through a predetermined angle with respect to a vertical line.

Figure 10B:
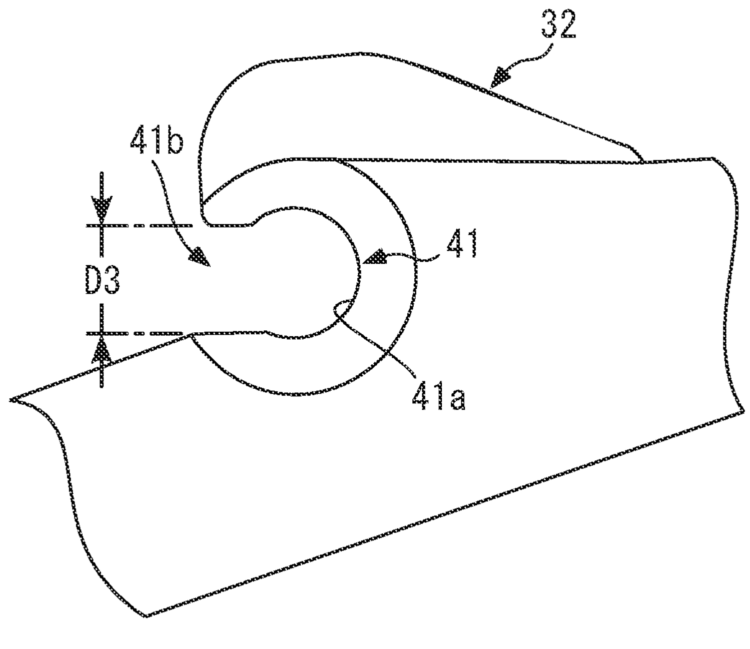

On the other hand, as shown in FIG. 10B, the bearing portion 41 of the second arm 32 includes an inner peripheral surface 41*a* having an arcuate shape in side view, and an opening 41*b* open toward a front end of the second arm 32. The above-mentioned inner peripheral surface 41*a* has a diameter set to a value approximately equal to the distance D1 between the vertices of the pair of curved surfaces 19*c* and 19*c* of the second pivot shaft 19*a*. That is, the inner peripheral surface 41*a* of the bearing portion 41 has approximately the same curvature as each curved surface 19*c* of the second pivot shaft 19*a*. Further, the opening 41*b* of the bearing portion 41 has an opening dimension D3 set to a value which is slightly larger than the distance D2 between the pair of planar surfaces 19*d* and 19*d* of the second pivot shaft 19*a*, and smaller than the distance D1 between the pair of curved surfaces 19*c* and 19*c* ($D2<D3<D1$).

FIGS. 11A to 11C and FIGS. 12A to 12C show a sequence of steps of mounting the first arm 31 and the second arm 32 on the keyboard chassis 4 e.g. at the time of manufacturing the keyboard device 1. This mounting procedure is a method of mounting the first arm 31 on the keyboard chassis 4 in a state in which the second arm 32 has been mounted on the keyboard chassis 4 in advance.

Figure 11A:
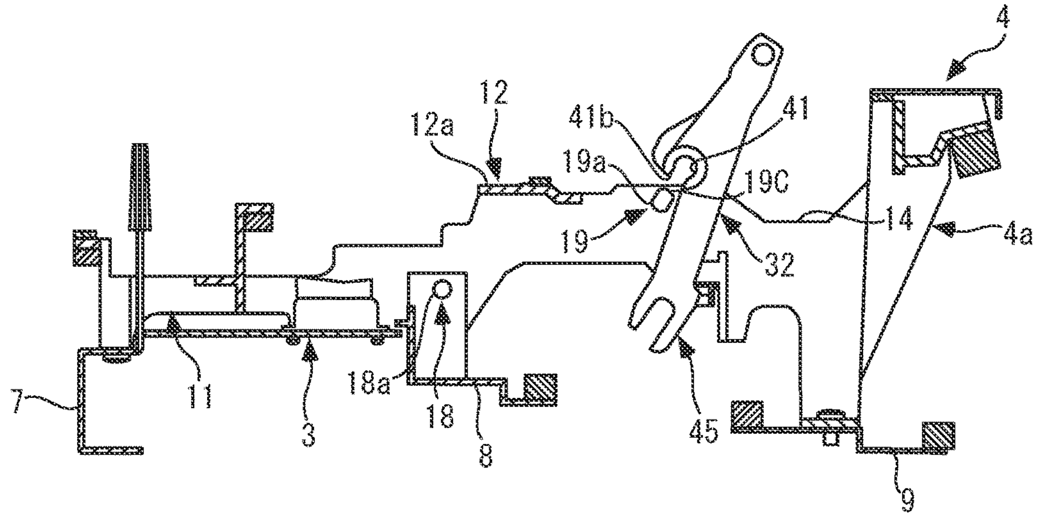
FIGS. 11A to 11C are views useful in explaining a sequence of steps of mounting the first arm and the second arm on the keyboard chassis, which show a case where the second arm is mounted before the first arm is mounted.
Figure 11B:
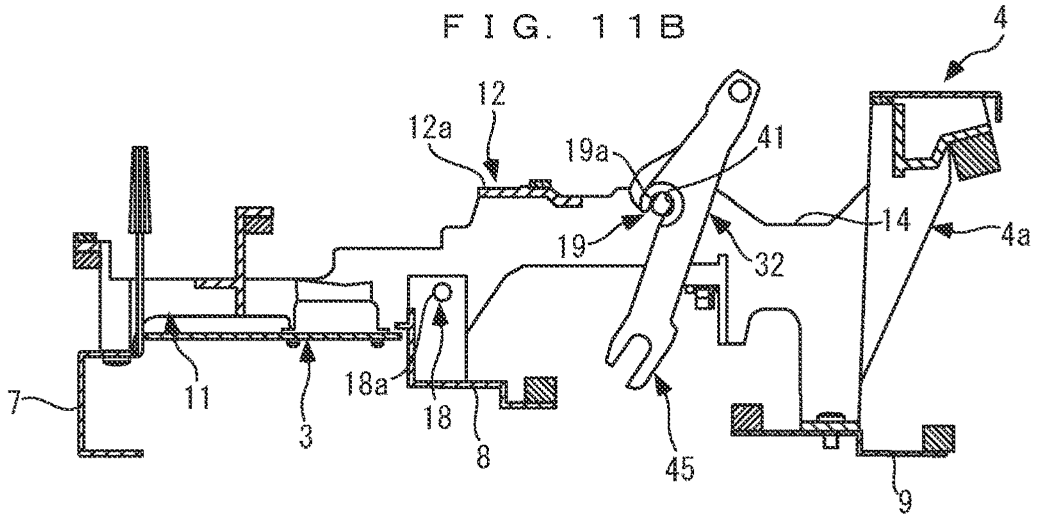

As shown in FIG. 11A, first, the second arm 32 is inserted into the second opening 5*b* (see FIG. 2) of the keyboard chassis 4 from above in a posture slightly inclined rearward with respect to a vertical line. In this case, the opening 41*b* of the bearing portion 41 of the second arm 32 is adjusted to an upper one of the curved surfaces 19*c* of the second pivot shaft 19*a* of the keyboard chassis 4, and as shown in FIG. 11B, the second pivot shaft 19*a* is inserted into the bearing portion 41. Thus, the second arm 32 is pivotally mounted on the second pivot shaft 19*a*.

Figure 11C:
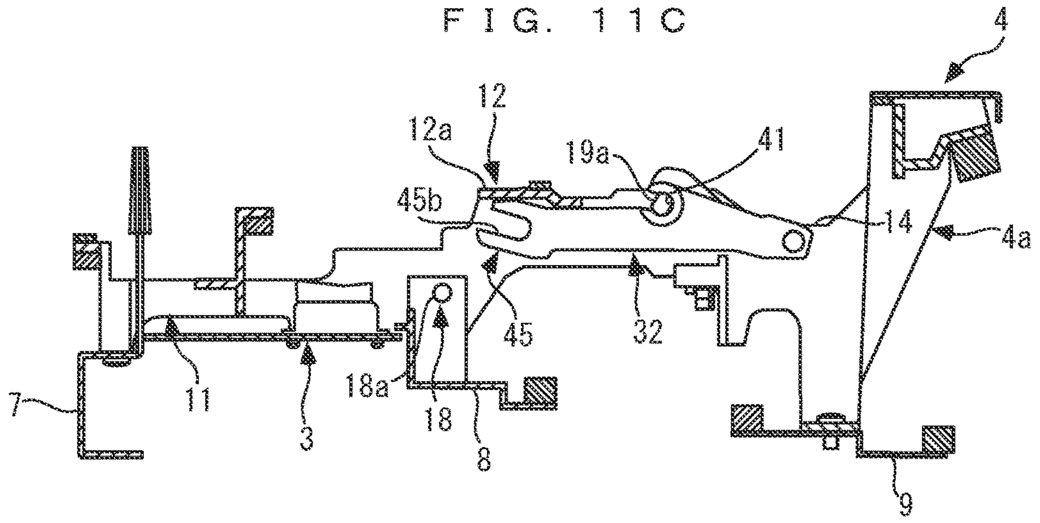

Next, as shown in FIG. 11C, the second arm 32 is pivotally moved in the clockwise direction about the second pivot shaft 19*a*, and is held in a substantially horizontal posture. In this case, the connecting recesses 45*b* and 45*b* of the second arm front-side connecting portion 45 face slightly upward with respect to a horizontal line.

Figure 12A:
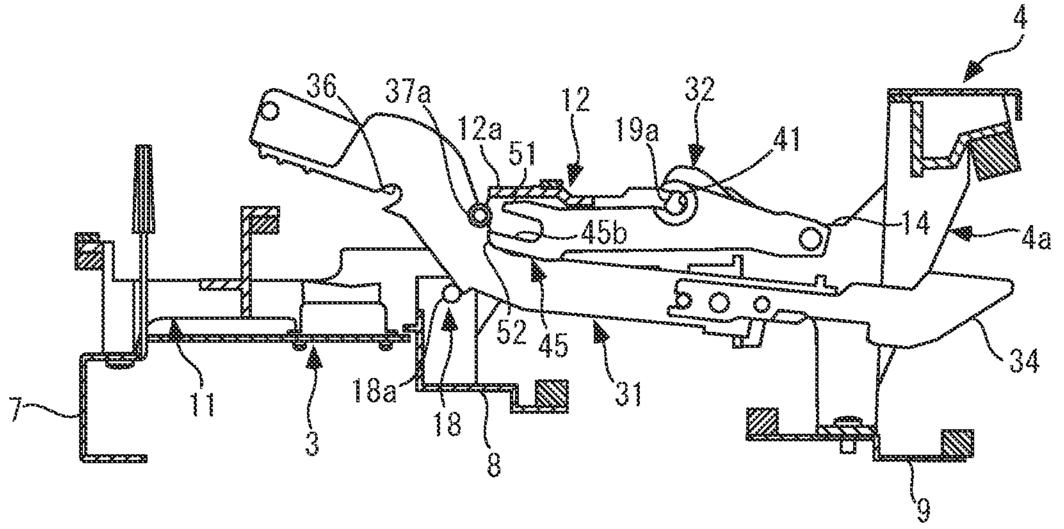
FIGS. 12A to 12C are views continued from FIGS. 11A to 11C.
Figure 12B:
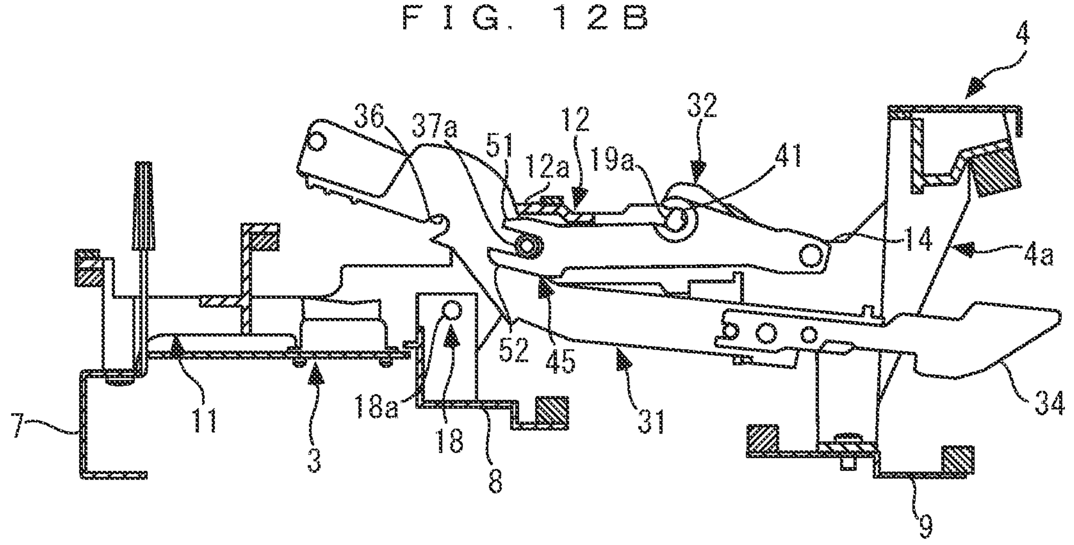

Next, as shown in FIG. 12A, the first arm 31 is inserted into an associated one of the first openings 5*a* (see FIG. 2) of the keyboard chassis 4 from the front side in a state slightly inclined downward toward the rear with respect to the horizontal line. Then, the first arm 31 is pushed rearward for inserting the connecting shaft 37*a* of the first arm 31 into the connecting recesses 45*b* of the second arm 32 from the front side, as shown in FIG. 12B. In this case, the lower second protrusion 52 of the second arm front-side connecting portion 45 protrudes forward of the upper first protrusion 51, and therefore, by performing an operation for connecting the two arms 31 and 32 by bringing a front end and an inner surface of the second protrusion 52 into contact with the connecting shaft 37*a* of the first arm 31, it is possible to use the second protrusion 52 as a guide, whereby it is possible to easily perform the operation for connecting the two arms 31 and 32. Thus, the first arm 31 is pivotally and slidably connected to the second arm 32 via the connecting shaft 37*a*.

Figure 12C:
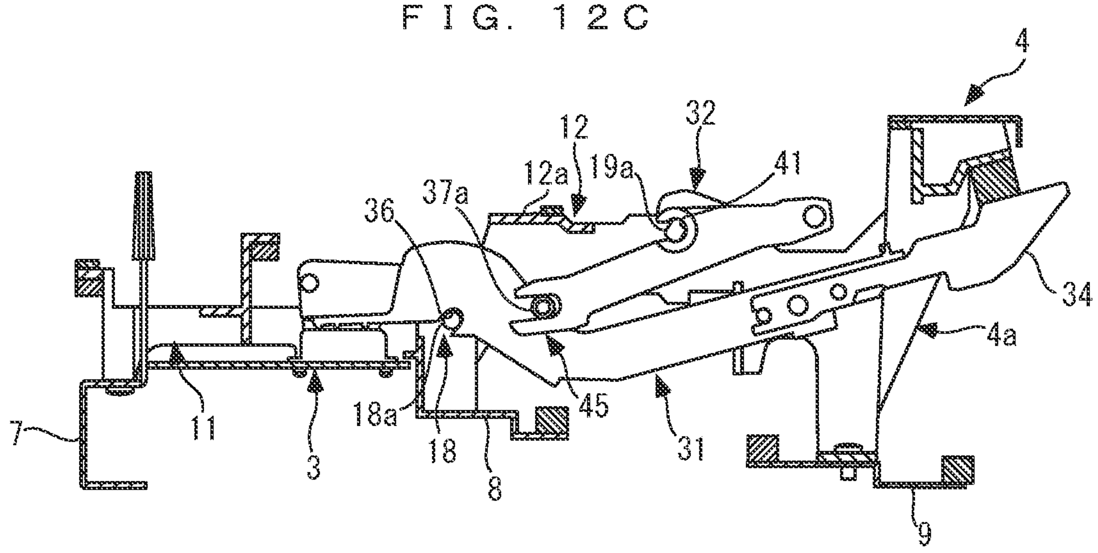

Then, as shown in FIG. 12C, a front portion of the first arm 31 is moved downward while maintaining the connected state of the first arm 31 and the second arm 32, whereby an associated one of the first pivot shafts 18*a* of the keyboard chassis 4 is inserted into the bearing portion 36 of the first arm 31. With this, the first arm 31 is pivotally mounted on the first pivot shaft 18*a*. This completes mounting of the first arm 31 and the second arm 32 on the keyboard chassis 4.

Next, a method of mounting the second arm 32 on the keyboard chassis 4 in a state in which the first arm 31 has been mounted on the keyboard chassis 4 in advance, contrary to the above-described mounting procedure, will be described with reference to FIGS. 13A to 13C.

Note that the second arm 32, which is mounted on the keyboard chassis 4 by the above-described method, is configured such that it is engaged with the second pivot shaft 19*a* of the keyboard chassis 4 by snap-fitting via the bearing portion 41 of the second arm 32. That is, as described hereinabove, although the opening dimension D3 of the opening 41*b* of the bearing portion 41 of the second arm 32 is smaller than the maximum diameter D1 of the second pivot shaft 19*a* (see FIGS. 10A and 10B), the second arm 32 is pressed toward the second pivot shaft 19*a* with some force in a state in which the opening 41*b* of the bearing portion 41 of the second arm 32 is in contact with the second pivot shaft 19*a*, whereby the opening 41*b* is temporarily widened to thereby allow the second pivot shaft 19*a* to pass into the bearing portion 41.

Figure 13A:
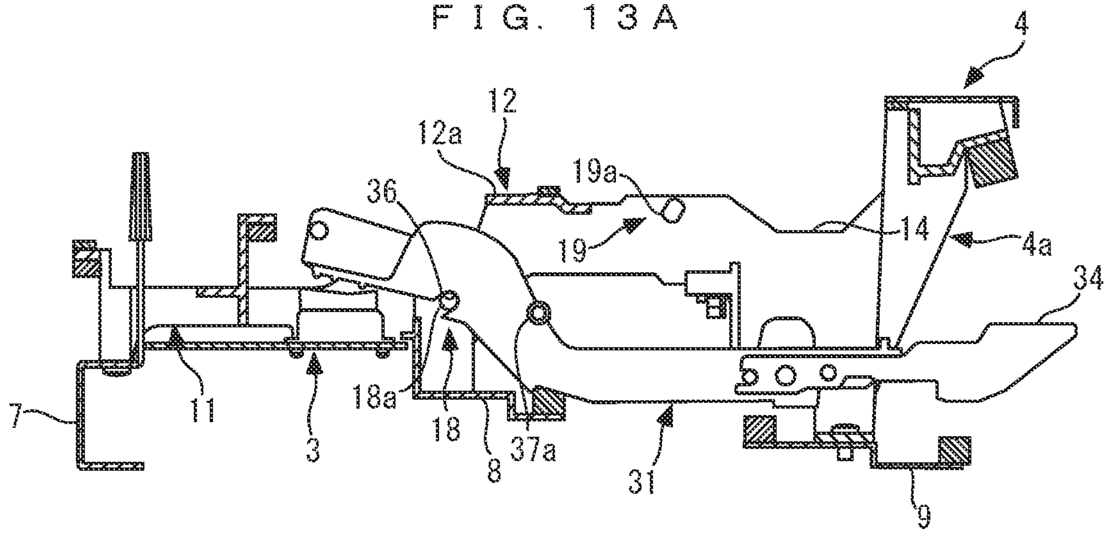
FIGS. 13A to 13C are views useful in explaining a sequence of steps of mounting the first arm and the second arm on the keyboard chassis, which show a case where the first arm is mounted before the second arm is mounted.

FIG. 13A shows a state in which the first arm 31 is mounted on the first pivot shaft 18*a* of the keyboard chassis 4. To mount the first arm 31 on the keyboard chassis 4, as described above, the first arm 31 is inserted into the associated first opening 5*a* of the keyboard chassis 4 from the front side in a state slightly inclined downward toward the rear with respect to the horizontal line, whereby the bearing portion 36 is engaged with the first pivot shaft 18*a*.

Figure 13B:
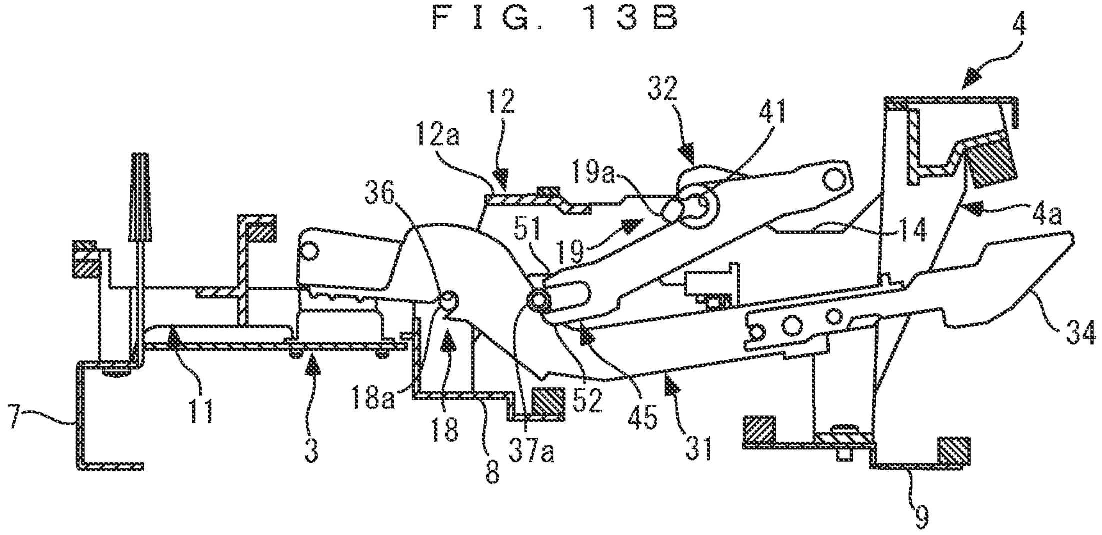
Figure 13C:
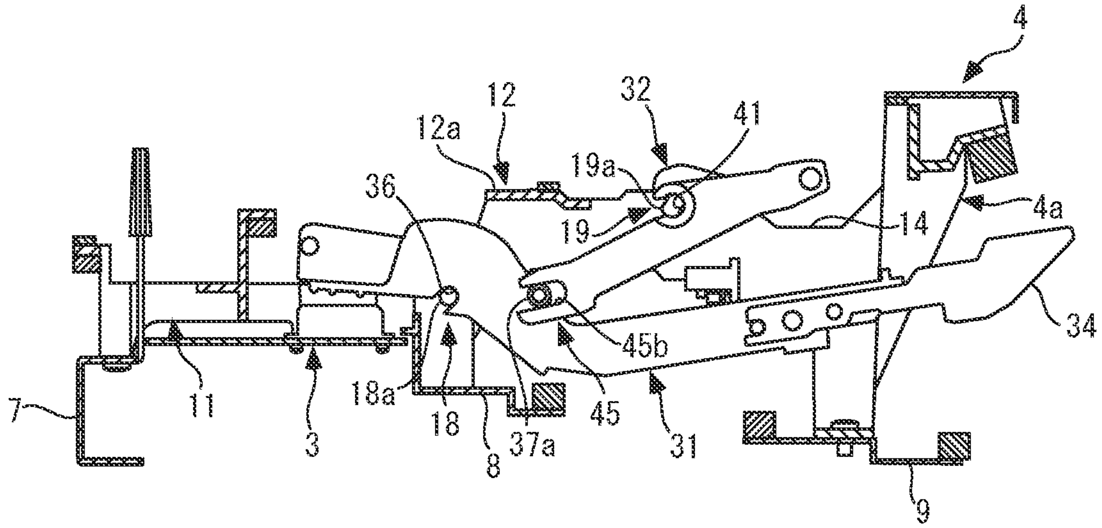

Then, as shown in FIG. 13B, the first arm 31 is held in a state slightly pivotally moved counterclockwise about the first pivot shaft 18*a*. Further, in this case, the second arm 32 is inserted into an associated one of the second openings 5*b* of the keyboard chassis 4 from above, whereby the opening 41*b* of the bearing portion 41 of the second arm 32 is brought into contact with the second pivot shaft 19*a*, and the front end and the inner surface of the second protrusion 52 of the second arm front-side connecting portion 45 are brought into contact with the connecting shaft 37*a* of the first arm 31.

Then, from the above-described state, the second arm 32 is pushed into the second pivot shaft 19*a* obliquely downward and forward, whereby the bearing portion 41 of the second arm 32 is engaged with the second pivot shaft 19*a* by snap-fitting, and the connecting recesses 45*b* of the second arm front-side connecting portion 45 are engaged with the connecting shaft 37*a* of the first arm 31. With this, as shown in FIG. 13C, the second arm 32 is pivotally mounted on the second pivot shaft 19*a*, and is pivotally and slidably connected to the connecting shaft 37*a* of the first arm 31. This completes mounting of the first arm 31 and the second arm 32 on the keyboard chassis 4.

Next, a description will be given of a method of removing the first arm 31 and the second arm 32 of the key support mechanism 6 from the keyboard chassis 4 at the time of maintenance of the keyboard device 1.

First, the first arm 31 and the second arm 32, which have been mounted on the keyboard chassis 4 by the procedure described above with reference to FIGS. 11A to 11C or FIGS. 12A to 12C, can be removed from the keyboard chassis 4 by a procedure contrary to the procedure described with reference to FIGS. 11A to 11C or FIGS. 12A to 12C. More specifically, the first arm 31 is removed from the first pivot shaft 18*a* of the keyboard chassis 4 from the state shown in FIG. 12C (see FIG. 12B), and is further disconnected from the second arm front-side connecting portion 45 of the second arm 32 (see FIG. 12A), whereby the first arm 31 is pulled out from the keyboard chassis 4. Then, as shown in FIG. 11B, the second arm 32 is pivotally moved in the counterclockwise direction, whereby the bearing portion 41 of the second arm 32 is removed from the second pivot shaft 19*a* of the keyboard chassis 4 (see FIG. 11A), and further, the second arm 32 is pulled out from the keyboard chassis 4. This completes removal of the first arm 31 and the second arm 32 from the keyboard chassis 4.

On the other hand, in the case where the first arm 31 and the second arm 32 are mounted on the keyboard chassis 4 by the procedure described above with reference to FIGS. 13A to 13C, that is, in the case where the second arm 32 is configured to be engaged with the second pivot shaft 19*a* by snap-fitting, it is preferable that the second arm 32 is provided with a tool engagement portion 53 with which a predetermined tool is engaged when the second arm 32 is removed from the second pivot shaft 19*a*.

Figure 14:
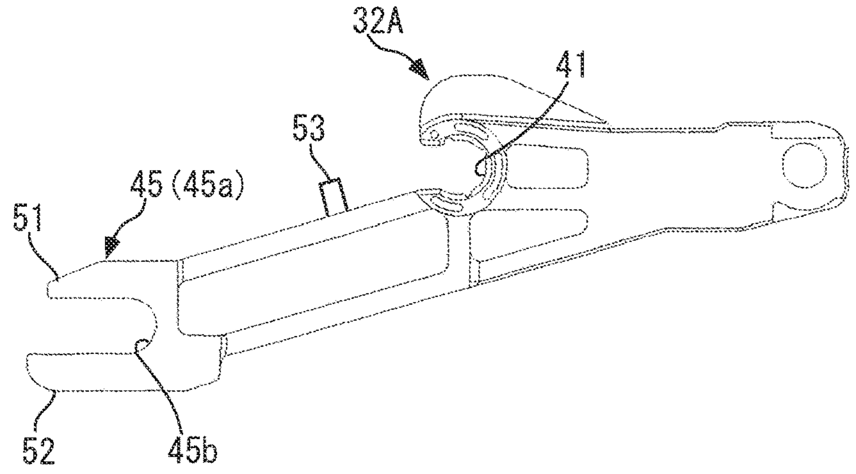
FIG. 14 is a side view showing the second arm which is provided with a tool engagement portion used in removing the second arm from the keyboard chassis, on an enlarged scale.

FIG. 14 shows a second arm 32A formed with the tool engagement portion 53. As shown in FIG. 14, at a predetermined location forward of the bearing portion 41 on an upper surface of the second arm 32A, the tool engagement portion 53 that protrudes upward a predetermined length is integrally formed with the second arm 32A.

Figure 15A:
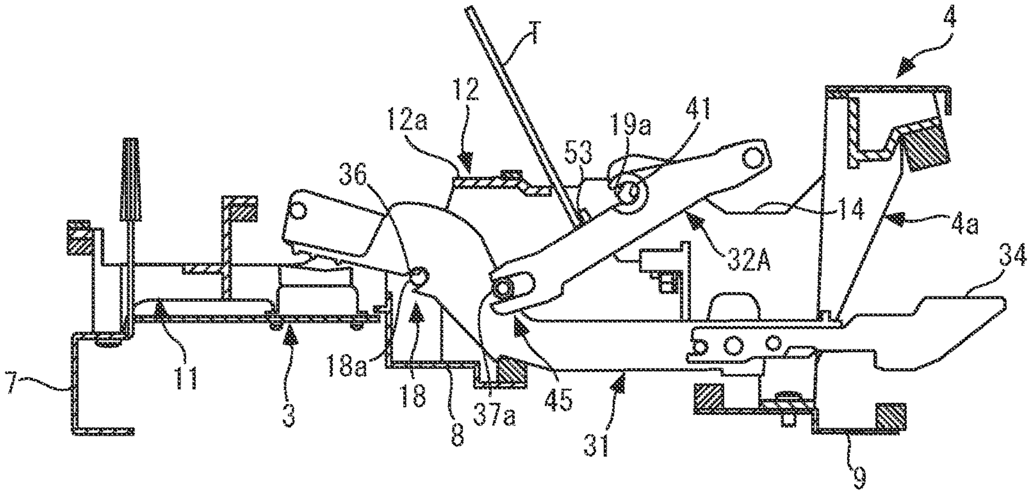
FIGS. 15A and 15B are views useful in explaining a sequence of steps of removing the second arm from the keyboard chassis.
Figure 15B:
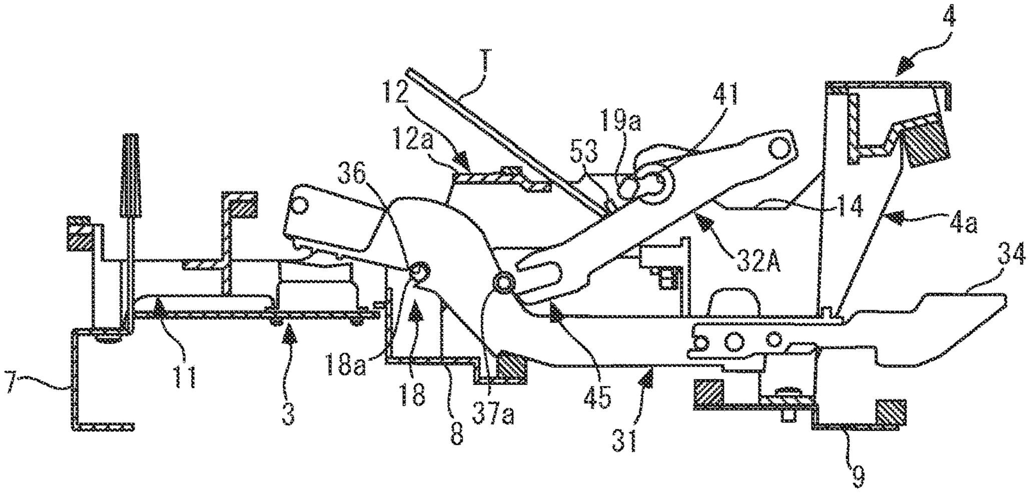

FIGS. 15A and 15B show a procedure for removing the second arm 32A from the second pivot shaft 19*a* of the keyboard chassis 4. As shown in FIG. 15A, first, a tool T in the form of a rod, such as a screwdriver, is inserted into the chassis intermediate 12 from above the keyboard chassis 4 to bring a tip end of the tool T into contact with the upper surface of the second arm 32A and a front surface of the tool engagement portion 53. Then, the tool T is inclined through a predetermined angle such that an upper end of the tool T is moved obliquely downward and forward. In this case, the second arm 32A is pushed obliquely upward and rearward using a portion of the tool T, which is brought into contact with the flat portion 12*a* of the chassis intermediate 12, as the fulcrum, and using the tip end of the tool T as the point of action, based on the principle of leverage. With this, the bearing portion 41 having been engaged with the second pivot shaft 19*a* by snap-fitting is disengaged from the second pivot shaft 19*a*. The second arm 32A mounted on the keyboard chassis 4 by snap-fitting can be thus easily removed from the keyboard chassis 4 using the tool T.

As described heretofore, according to the present embodiment, since the first arm 31 and the second arm 32 can be relatively easily mounted on the keyboard chassis 4, it is possible to improve the ease of assembly of the key support mechanism 6 including the first arm 31 and the second arm 32 at the time of manufacturing the keyboard device 1 and the like. Further, since the first arm 31 and the second arm 32 can be removed from the keyboard chassis 4 by the procedure contrary to the above-described procedure, it is possible to improve the ease of disassembly of the key support mechanism 6 at the time of maintenance of the keyboard device 1.

Note that the present invention is not limited to the above-described embodiment, but it can be practiced in various forms. Although in the above-described embodiment, the second protrusion 52 of the front end of the second arm 32 is formed such that it protrudes forward of the first protrusion 51, it is also possible to form the first protrusion 51 such that it protrudes forward of the second protrusion 52. Further, although in the above-described embodiment, the second arm 32A, which is engaged with the second pivot shaft 19*a* by snap-fitting, has the tool engagement portion 53 formed thereon such that the tool engagement portion 53 protrudes from the upper surface of the second arm 32A, this is not limitative, but any suitable tool engagement portion may be employed insofar as it is engaged with the tip end of the tool T when the second arm 32A is removed from the keyboard chassis 4. For example, it is possible to employ a tool engagement portion formed into a concave shape in the upper surface of the second arm 32A.

Further, details of the constructions of the keyboard chassis 4, the key support mechanism 6, the first arm 31, and the second arm 32 shown in the embodiment are given only by way of example, and they can be changed as appropriate within the scope of the subject matter of the present invention.

It is further understood by those skilled in the art that the foregoing are preferred embodiments of the invention, and that various changes and modifications may be made without departing from the spirit and scope thereof.

What is claimed is:

1. A keyboard device for a keyboard instrument, including:

a keyboard chassis, a key extending a predetermined length in a front-rear direction and disposed on the keyboard chassis, and a key support mechanism engaged with the keyboard chassis and provided so as to support the key from below, the key support mechanism causing, upon depression of the key, the depressed key to operate such that the key pivotally moves about a virtual pivot located rearward of a rear end of the key, wherein the key support mechanism comprises:

a first arm configured to extend a predetermined length in the front-rear direction and be pivotally and removably engaged with a first pivot shaft provided on the keyboard chassis, the first arm having a front end pivotally and slidably connected to a front portion of the key; and a second arm configured to extend a predetermined length in the front-rear direction and be pivotally and removably engaged with a second pivot shaft provided on the keyboard chassis at a location rearward of the first pivot shaft, the second arm having a rear end pivotally connected to a rear portion of the key, and including a second arm front-side connecting portion which is disposed forward of the second pivot shaft and is pivotally, slidably and removably connected to a first arm rear-side connecting portion rearward of the first pivot shaft of the first arm, wherein the first arm and the second arm are configured such that when the first arm and the second arm are mounted on the keyboard chassis at the time of assembly of the keyboard device, in a state in which one of the first arm and the second arm is pivotally engaged with the keyboard chassis, the other of the first arm and the second arm is capable of being mounted on the keyboard chassis while being connected to the one of the first arm and the second arm.

2. The keyboard device according to claim 1, wherein the second arm front-side connecting portion includes a first protrusion and a second protrusion disposed with a predetermined spacing therebetween and protruding forward of the second arm by a predetermined length, the second arm front-side connecting portion having a U shape open forward of the second arm in side view, and wherein a front end of one of the first protrusion and the second protrusion is formed to protrude forward of a front end of the other of the first protrusion and the second protrusion.

3. The keyboard device according to claim 1, wherein the second arm includes a bearing portion formed into a C shape in side view, for being engaged with the second pivot shaft by snap-fitting.

4. The keyboard device according to claim 3, wherein the second arm is formed with a tool engagement portion with which a predetermined tool is engaged when the second arm is removed from the keyboard chassis at the time of maintenance of the keyboard device.

* * * * *